(12) United States Patent
Tokuyama et al.

(10) Patent No.: US 6,798,408 B2
(45) Date of Patent: Sep. 28, 2004

(54) IMAGE GENERATION APPARATUS, METHOD AND RECORDING MEDIUM

(75) Inventors: Katsuya Tokuyama, Tokyo (JP); Ryoichi Kaku, Tokyo (JP)

(73) Assignee: Namco Ltd., Tokyo (JP)

( * ) Notice: Subject to any disclaimer, the term of this patent is extended or adjusted under 35 U.S.C. 154(b) by 382 days.

(21) Appl. No.: 09/912,547

(22) Filed: Jul. 26, 2001

(65) Prior Publication Data

US 2002/0022517 A1 Feb. 21, 2002

(30) Foreign Application Priority Data

Jul. 27, 2000 (JP) ........................................ 2000-226933

(51) Int. Cl.⁷ .............................................. G06T 15/60
(52) U.S. Cl. ..................... 345/426; 345/427; 345/581; 345/582; 345/589
(58) Field of Search .............................. 345/419, 426, 345/427, 581, 582, 589

(56) References Cited

U.S. PATENT DOCUMENTS

| | | |
|---|---|---|
| 4,835,532 A | 5/1989 | Fant |
| 5,499,323 A | 3/1996 | Doi et al. |
| 5,577,175 A * | 11/1996 | Naka et al. ................. 345/427 |
| 5,586,230 A | 12/1996 | Leon et al. |
| 5,616,031 A | 4/1997 | Logg |
| 5,729,672 A | 3/1998 | Ashton |
| 5,739,820 A | 4/1998 | Lyon |
| 5,742,749 A | 4/1998 | Foran et al. |
| 5,777,175 A | 7/1998 | Ohkubo et al. |
| 5,777,620 A | 7/1998 | Billyard |
| 5,808,619 A | 9/1998 | Choi et al. |
| 5,870,098 A | 2/1999 | Gardiner |
| 5,880,736 A | 3/1999 | Peercy et al. |
| 6,014,472 A | 1/2000 | Minami et al. |
| 6,018,350 A | 1/2000 | Lee et al. |
| 6,040,835 A | 3/2000 | Gibson |
| 6,064,393 A | 5/2000 | Lengyel et al. |
| 6,078,333 A | 6/2000 | Wittig et al. |
| 6,078,334 A | 6/2000 | Hanaoka et al. |
| 6,081,274 A | 6/2000 | Shiraishi |
| 6,100,895 A | 8/2000 | Miura et al. |
| 6,104,406 A | 8/2000 | Berry et al. |
| 6,166,738 A | 12/2000 | Robertson et al. |
| 6,195,099 B1 | 2/2001 | Gardiner |
| 6,203,431 B1 | 3/2001 | Miyamoto et al. |
| 6,222,554 B1 | 4/2001 | Berry et al. |
| 6,252,608 B1 | 6/2001 | Snyder et al. |
| 6,262,742 B1 | 7/2001 | Tampieri |

* cited by examiner

Primary Examiner—Mark Zimmerman
Assistant Examiner—Kimbinh T. Nguyen
(74) Attorney, Agent, or Firm—Miles & Stockbridge P.C.; James T. Carmichael

(57) ABSTRACT

An image generation apparatus, method and recording medium capable of expressing natural shadows with respect to changes of the motion of the character and creating shadows with less load on the CPU. It is possible to express a natural shadow with respect to changes of a motion of a character by changing density, degree of transparency and scale of a shadow object according to the positional relationship, speed relationship between a three-dimensional body and topographical object or environment surrounding the observing point etc. Even if the character has at least two legs (reference legs) and moves these legs, it is possible to determine the scale of the shadow object after the motion and display the shadow object based on desired reference points. The reference points can be obtained by assigning predetermined weights to a projection point Pc of a lumbar part c parallel-projected onto a topographical object, a projection point Pa corresponding to a right leg a and a projection point Pb corresponding to a left leg b.

37 Claims, 13 Drawing Sheets

IMAGE GENERATION APPARATUS, METHOD AND RECORDING MEDIUM

BACKGROUND OF THE INVENTION

1. Field of the Invention

The present invention relates to an image generation apparatus, method and recording medium, and more particularly, to an image generation apparatus, method and recording medium for generating a shadow object to express the shadow of a three-dimensional body set in a virtual space.

2. Description of Related Art

In recent years, when a three-dimensional body such as a character is displayed in a virtual space in a computer game etc., a more realistic game is realized by showing the shadow of the character on topographical features etc. Conventionally, two methods are known to express the shadow of a character in a computer game etc.; a method of expressing the shadow by substituting a simple shape such as a circle for it and a method of expressing the shadow by setting a desired light source in a virtual space of the computer game and calculating influences of the light from this light source on the character etc. in real time.

The former method expresses the shadow of the character using a simple shape such as a circle or ellipse and has a merit of imposing less load on the computer (CPU), whereas this method has a problem of having difficulty to express a natural shadow with respect to changes of the character's action. On the other hand, the latter method calculates the influences of light from the light source in real time and can therefore express the shadow in greater detail, but has a problem of imposing heavy burden on the CPU.

In the case of a three-dimensional body such as a character having legs, even if the character moves such as spreading his/her legs apart, the size (scale) of the shadow according to the conventional art remains unchanged. Furthermore, in the case of a three-dimensional body such as a character having a lumbar part, the conventional art displays the shadow like a circle right beneath the lumbar part. This causes a problem of having difficulty to express the shadow in accordance with the motion of the character.

SUMMARY OF THE INVENTION

The present invention has been achieved to solve the problems described above and it is an object of the present invention to provide an image generation apparatus, method and recording medium capable of expressing natural shadows according to changes of motions of a character and creating shadows with less load on the CPU.

It is another object of the present invention to provide an image generation apparatus, method and recording medium capable of generating lively shadows according to motions of the character even when the character has a motion such as spreading his/her legs apart.

According to a first aspect of the present invention, there is provided an image generation apparatus that generates a shadow object to express the shadow of a three-dimensional body set in a virtual space, comprising: a topographical object on which the shadow object of the three-dimensional body is displayed; and shadow object generating means for generating a shadow object to be displayed on the topographical object according to a positional relationship between the three-dimensional body and the topographical object.

According to a second aspect of the present invention, there is provided an image generation apparatus that generates a shadow object to express the shadow of a three-dimensional body set in a virtual space, comprising: a topographical object on which the shadow object of the three-dimensional body is displayed; and shadow object generating means for generating a shadow object to be displayed on the topographical object according to a speed relationship between the three-dimensional body and the topographical object.

According to a third aspect of the present invention, there is provided an image generation apparatus that generates a shadow object to express the shadow of a three-dimensional body set in a virtual space, comprising: a topographical object on which the shadow object of the three-dimensional body is displayed; and shadow object generating means for generating a shadow object to be displayed on the topographical object according to the distance between a predetermined observing point in the virtual space and the three-dimensional body.

According to a fourth aspect of the present invention, there is provided an image generation method for generating a shadow object to express the shadow of a three-dimensional body set in a virtual space, wherein a shadow object of the three-dimensional body to be displayed on a topographical object is generated according to a positional relationship between the three-dimensional body and the topographical object.

According to a fifth aspect of the present invention, there is provided an image generation method for generating a shadow object to express the shadow of a three-dimensional body set in a virtual space, wherein a shadow object of the three-dimensional body to be displayed on a topographical object is generated according to a speed relationship between the three-dimensional body and the topographical object.

According to a sixth aspect of the present invention, there is provided an image generation method for generating a shadow object to express the shadow of a three-dimensional body set in a virtual space, wherein a shadow object of the three-dimensional body to be displayed on a topographical object is created according to the distance between a predetermined observing point in the virtual space and the three-dimensional body.

According to a seventh aspect of the present invention, there is provided a recording medium storing a computer-readable program to execute an image generation method for generating a shadow object to express the shadow of a three-dimensional body set in a virtual space, wherein a shadow object of the three-dimensional body to be displayed on a topographical object is created according to a positional relationship between the three-dimensional body and the topographical object.

According to a eighth aspect of the present invention, there is provided a recording medium storing a computer-readable program to execute an image generation method for generating a shadow object to express the shadow of a three-dimensional body set in a virtual space, wherein a shadow object of the three-dimensional body to be displayed on a topographical object is created according to a speed relationship between the three-dimensional body and the topographical object.

According to a ninth aspect of the present invention, there is provided a recording medium storing a computer-readable program to execute an image generation method for generating a shadow object to express the shadow of a three-dimensional body set in a virtual space, wherein a shadow object of the three-dimensional body to be displayed on a topographical object is created according to the distance between a predetermined observing point in the virtual space and the three-dimensional body.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

Figure 1:
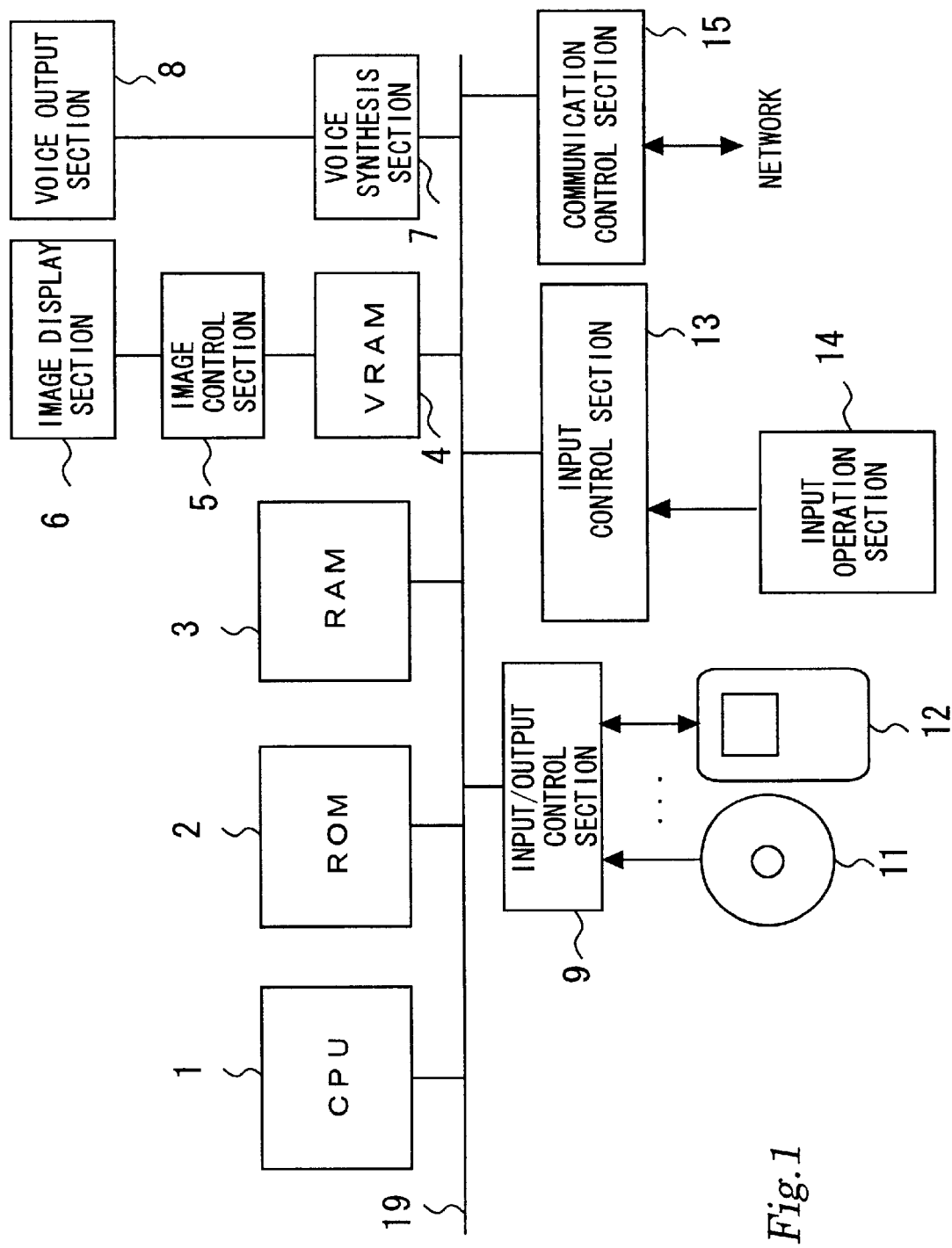
FIG. 1 is an internal circuit block of the image generation apparatus of the present invention.

With reference now to the attached drawings, parts common to embodiments of an image generation apparatus of the present invention will be explained first, followed by detailed descriptions of the respective embodiments below. It is noted that the same reference symbols in the drawings denote the same or corresponding components.

FIG. 1 is an internal circuit block of the image generation apparatus of the present invention. In FIG. 1, reference numeral 10 denotes an internal circuit block of the image generation apparatus of the present invention; 1: a processing unit CPU (Central Processing Unit) that executes a computer game etc.; 2: a read-only storage apparatus ROM (Read Only Memory) storing data necessary for initialization or other processing of the internal circuit block 10 of the image generation apparatus etc. of the present invention; 3: a readable/writable storage apparatus RAM (Random Access Memory) storing a computer program or data executed by the CPU 1; 4: a storage apparatus VRAM (Video RAM) having a capacity of data corresponding to at least one screen of an image display section 6, which is used as an image memory and will be explained later; 5: an image control section that converts data of the VRAM 4 to image data and sends to the image display section 6; 6: an image display section such as a display that generates an image based on the image data converted by and sent out from the VRAM 4; 7: a speech synthesis section that synthesizes speech generated by execution of the image generation method etc. of the present invention; 8: a speech output section that is connected to the speech synthesis section 7 and outputs speech; 11: a recording medium section in which a detachable recording medium such as a computer-readable CD-ROM (Compact Disc—Read Only memory) storing a computer program or data to execute the image generation method etc. of the present invention is set; 12: a recording medium section in which a detachable recording medium such as a memory card is set; 9: an input/output control section that is connected to the recording medium section 11 or 12 and controls input/output; 14: an input operation section such as a controller used by the player to play a computer game using the image generation apparatus of the present invention; 13: an input control section that is connected to the input operation section 14 and performs input control etc.; 15: a communication control section that controls communications with an external computer etc. over a network (not shown); and 19: a bus that connects the CPU 1, ROM 2, RAM 3, VRAM 4, speech synthesis section 7, input/output control section 9, input control section 13 and communication control section 15.

The computer program to execute the image generation method etc. of the present invention and data can be recorded in a recording medium such as a CD-ROM or memory card etc. set in the recording medium section 11 or 12. The computer program and data above recorded in a recording medium such as a CD-ROM or memory card etc. are loaded to the RAM 3 via the input/output control section 9 through the bus 14. By executing the computer program above loaded to the RAM 3, the CPU 1 allows the player to enter commands from the input operation section 14 via the input control section 13, the image being executed to be formed on the image display section 6 and the speech output section 8 to output the speech being executed.

Figure 2:
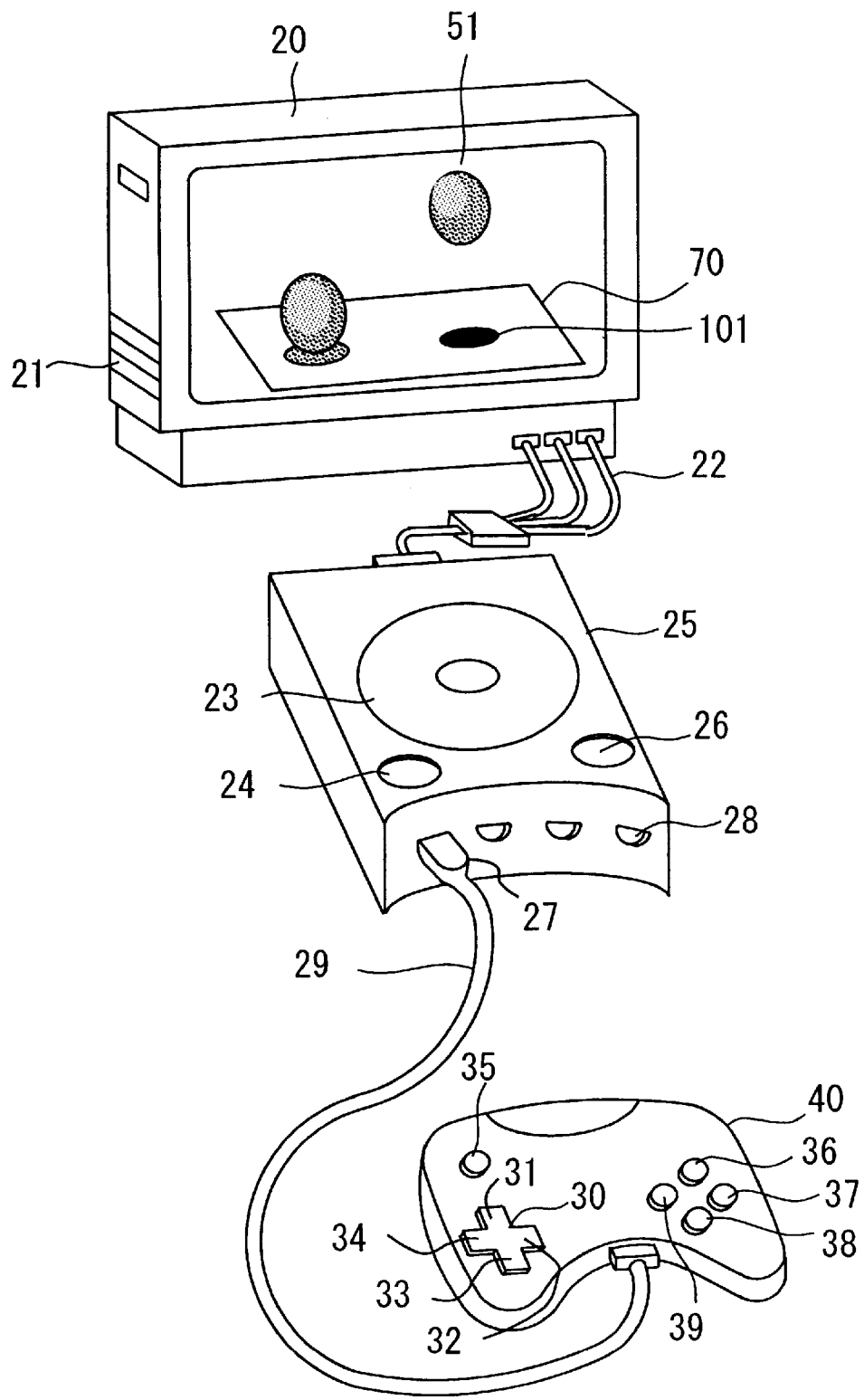
FIG. 2 shows an embodiment of the image generation apparatus of the present invention.

FIG. 2 shows an embodiment of the image generation apparatus of the present invention. In FIG. 2, reference numeral 20 denotes a display of an embodiment of the image display section 16; 21: a speaker of an embodiment of the speech output section 8; 51: a three-dimensional body such as a character in the computer game formed on the display 20 (hereinafter referred to as "character 51 etc." to specifically indicate a three-dimensional body such as a character having a specific shape and as "three-dimensional body 51 etc." to generally indicate a three-dimensional body); 101: a shadow object 101 to express the shadow of the three-dimensional body 51 formed on the display 20; 70: a topographical object on which the shadow object 101 is displayed; 22: cables that connect an image generation apparatus 25 which will be described later and the display 20; 25: an image generation apparatus including the internal circuit 10; 23: a cover that covers the recording medium section 11 in which a recording medium such as CD-ROM is set; and 26: a button to open the cover 23 and it is possible to open the cover 23 and set a recording medium by pressing this button 26, and to close the cover 23 by pressing the cover 23. Reference numeral 24 denotes a power supply button of the image generation apparatus 25; 29: a cable that connects the image generation apparatus 25 and a controller 40 which will be described later; 27 and 28 etc.: connection terminals that connect the controller 40 and image generation apparatus 25; and 40: a controller which is an embodiment of the input operation section 14 operated by the player. FIG. 2 shows four connection terminals 27, 28 etc. and the cable 29 is connected to the connection terminal 27 of those connection terminals. However, the number of the connection terminals 27 etc. is not limited to 4. Reference numeral 30 denotes a directional key to operate the movement of the three-dimensional body 51; 31: an UP key to move upward; 32: a RIGHT key to move rightward; 33: a DOWN key to move downward; 34: a LEFT key to move leftward; 35: a start key to start or pause the computer game; 36, 37, 38 and 39: action keys having the functions of operating the progress of the computer game or actions of the three-dimensional body 51. Pressing the UP key 31 and LEFT key 34 simultaneously allows the three-dimensional body 51 to be moved in the left oblique upward direction. Similar operations apply to combinations of the other directional keys 31, 32, 33 and 34.

Embodiments of the present invention will be explained in detail below.

First Embodiment

Figure 3:
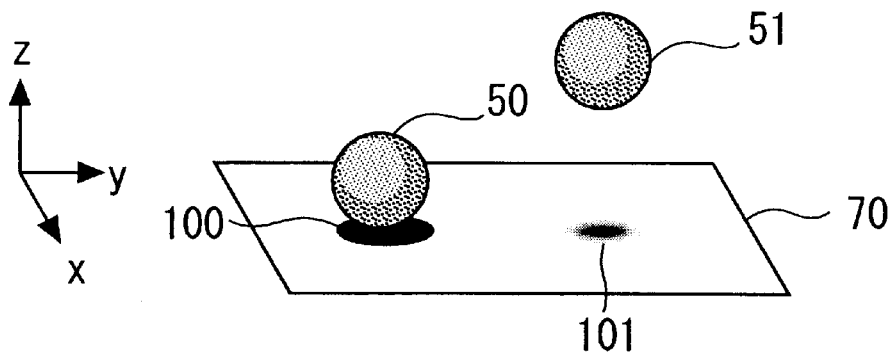
FIG. 3 shows an example of a shadow object generated according to First Embodiment of the present invention.

FIG. 3 shows an example of a shadow object generated according to First Embodiment of the present invention. In FIG. 3, reference numerals 50 and 51 denote three-dimensional bodies; 100: a shadow object of the three-dimensional body 50; 101: a shadow object of the three-dimensional body 51; 70: a topographical object on which the shadow objects 100 and 101 are displayed.

As shown in FIG. 3, the topographical object 70 is expressed by a plane parallel to the xy plane in a virtual space, and the three-dimensional body 50 is expressed as having contact with the topographical object 70 and the three-dimensional body 51 is expressed as floating in the z direction in the virtual space. The shadow object 100 or 101 can be generated according to a positional relationship such as the distance between the three-dimensional body 50 or 51 and the topographical object 70 (shadow object generating means). For example, since the three-dimensional body 50 contacts the topographical object 70, its shadow object 100 can be expressed in black as shown in FIG. 3. On the other hand, since the three-dimensional body 51 is floating above the topographical object 70, its shadow object 101 is expressed with a high degree of transparency. Here, increasing the degree of transparency means that the color (not shown) of the topographical object 70 is seen through. In this way, the shadow object 101 can be expressed with its degree of transparency gradually increased as the three-dimensional body 51 goes apart from the topographical object 70 and with its degree of transparency gradually decreased as the three-dimensional body 51 comes closer to the topographical object 70.

In FIG. 3, shadowing is applied to the shadow object 101 in such a way that the density of the shadow object 101 becomes thinner toward the periphery. However, it is also possible to express the entire shadow object 101 uniformly with desired density. When this Specification states that the density of the shadow object 101 etc. is thinned, both cases above are assumed to be included unless specified otherwise.

As shown above, according to First Embodiment, the shadow object can be created in black when the three-dimensional body contacts the topographical object and when the three-dimensional body does not contact the topographical object, the shadow object can be expressed with the degree of transparency increased as the distance between the three-dimensional body and the topographical object increases and with the degree of transparency decreased as the distance between the three-dimensional body and the topographical object decreases. This makes it possible not only to express a natural shadow according to the distance between the three-dimensional body and the topographical object but also to create a shadow object with less load on the CPU by providing a simple figure.

Second Embodiment

Figure 4A:
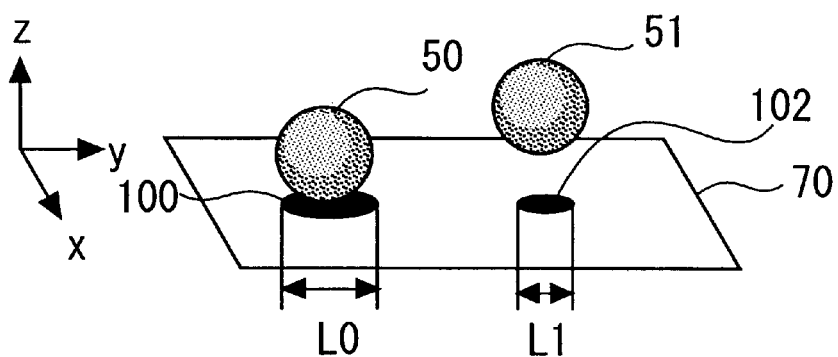
FIG. 4A and FIG. 4B show examples of shadow objects generated according to Second Embodiment of the present invention.
Figure 4B:
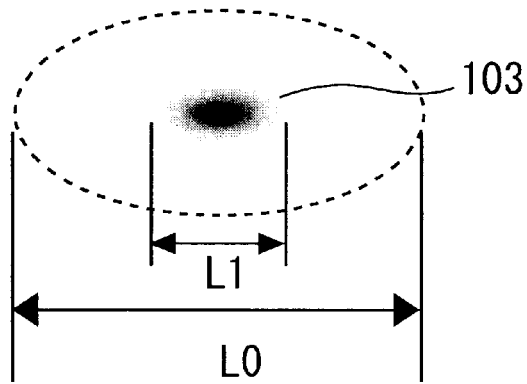

FIG. 4A and FIG. 4B show examples of shadow objects generated according to Second Embodiment of the present invention. The parts in FIG. 4A and FIG. 4B assigned the same reference numerals as those in FIG. 3 indicate the same components, and therefore explanations thereof will be omitted.

In FIG. 4A, reference numeral 102 denotes a shadow object expressed opaque in Second Embodiment of the three-dimensional body 51; L0: a scale represented by the diameter etc. of the shadow object 100 when the shadow object of the three-dimensional body 50 is generated based on parallel projection; L1: a scale of the shadow object 102. As shown in FIG. 4A, according to Second Embodiment, the three-dimensional object 51 is floating above the topographical object 70 as in the case of First Embodiment. In First Embodiment above, the scale of the shadow object 101 of the three-dimensional object 51 is expressed identical to the scale of the shadow object 100. However, Second Embodiment expresses the scale L1 of the shadow object 102 of the three-dimensional object 51 contracted compared to the scale L0 of the shadow object 100. Thus, it is possible to express the shadow object 102 with its scale L1 gradually contracted as the three-dimensional body 51 goes apart from the topographical object 70.

FIG. 4B shows a shadow object 103 of the three-dimensional body 51 expressed in a different way. As shown in FIG. 4B, it is possible to express the scale L1 of the shadow object 103 of the three-dimensional object 51 smaller than the scale L0 of the shadow object 100 as shown above and further express it with the degree of transparency increased as in the case of the shadow object 101 according to First Embodiment. That is, it is possible to express the scale L1 of the shadow object 103 gradually reduced and with the degree of transparency increased as the three-dimensional body 51 goes apart from the topographical object 70. It is possible to generate the shadow object 103 by calculating it as the three-dimensional body 51 goes apart from the topographical object 70 or generate it beforehand according to the distance between the three-dimensional body 51 and the topographical object 70 and gradually display the shadow object 103 created beforehand.

As stated above, according to Second Embodiment, when the three-dimensional body contacts the topographical object, it is possible to generate the shadow object with a scale based on parallel projection and when the three-dimensional body does not contact the topographical object, generate the shadow object with its scale reduced as the distance between the three-dimensional body and the topographical object increases. Furthermore, it is also possible to generate the shadow object with its density reduced as well as its scale. This makes it possible not only to express a natural shadow according to the distance between the three-dimensional body and the topographical object but also generate a shadow object with less load on the CPU by providing a simple figure.

Third Embodiment

Figure 5A:
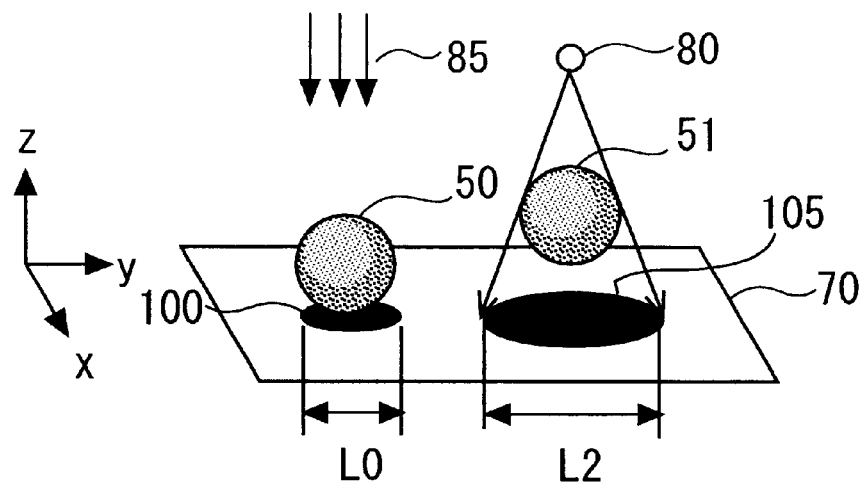
FIG. 5A and FIG. 5B show examples of shadow objects generated according to Third Embodiment of the present invention.
Figure 5B:
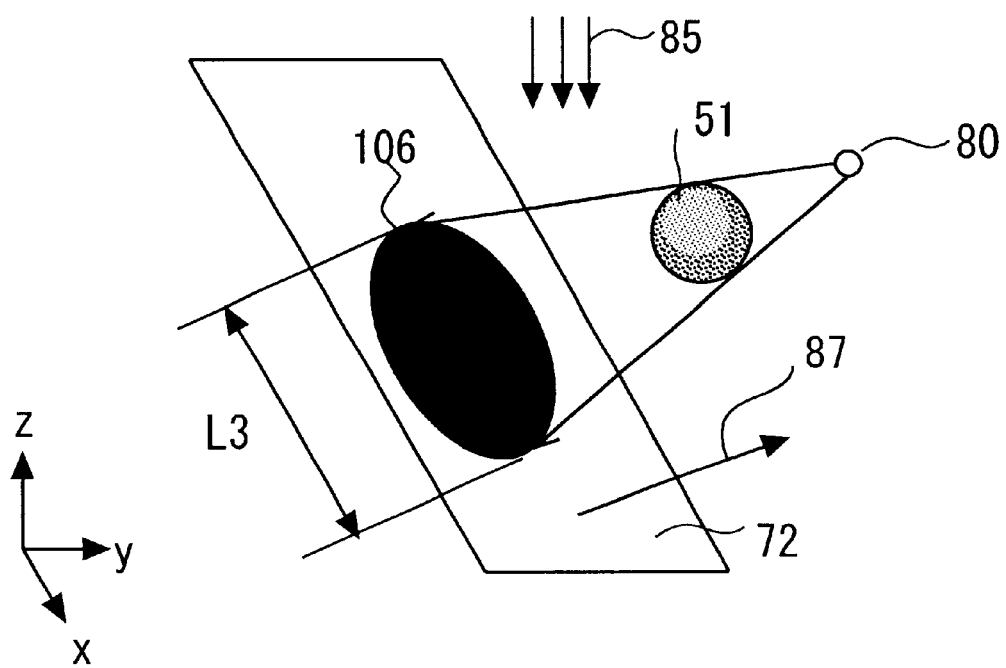

FIG. 5A and FIG. 5B show examples of shadow objects generated according to Third Embodiment of the present invention. The parts in FIG. 5A and FIG. 5B assigned the same reference numerals as those in FIG. 3 indicate the same components, and therefore explanations thereof will be omitted.

In FIG. 5A, reference numeral 105 denotes a shadow object expressed opaque in Third Embodiment of the three-dimensional body 51; L2: a scale of the shadow object 105; 80: a point light source (center of a predetermined projection line) set in a virtual space. As shown in FIG. 5A, according to Third Embodiment as in the case of First Embodiment, the three-dimensional object 51 is floating above the topographical object 70, which is parallel to the xy plane. The shadow object 100 of the three-dimensional body 50 is generated based on parallel projection by parallel light beam 85, which is parallel to the z-axis. Second Embodiment above expresses the scale L1 of the shadow object 102 of the three-dimensional object 51 contracted compared to the scale L0 of the shadow object 100. However, Third Embodiment can express the shadow object 105 of the three-dimensional object 51, which is floating above the topographical object 70 through perspective projection from the point light source (center of a predetermined projection line) 80. Thus, it is possible to express the shadow object 105 with its scale L2 magnified compared to scale L0 of the shadow object 100. As a result, it is possible to express the shadow object 105 with its scale L2 gradually magnified as the three-dimensional body 51 goes apart from the topographical object 70.

In FIG. 5B, reference numeral 72 denotes a topographical object having a gradient which does not form a right angle with the parallel light beam 85; 87: a normal of the topographical object 72; and 106: a shadow object obliquely projected onto the topographical object 72 by the point light source 80.

As shown in FIG. 5B, even if the normal 87 of the topographical object 72 has a gradient, which does not form a right angle with the parallel light beam 85, it is possible to generate the shadow object 106 of the three-dimensional body 51 through oblique projection from the point light source 80. That is, it is possible to express the shadow object 106 with its scale L3 gradually magnified as the three-dimensional body 51 goes apart from the topographical object 72.

As stated above, according to Third Embodiment, when the three-dimensional body contacts the topographical object, it is possible to generate the shadow object with a scale based on parallel projection and when the three-dimensional body does not contact the topographical object, generate the shadow object through perspective projection from a point light source. As a result, it is possible to express the shadow object with its scale gradually magnified as the three-dimensional body goes apart from the topographical object or as the three-dimensional body comes closer to the point light source. This makes it possible to express a natural shadow according to the distance between the three-dimensional body and the topographical object.

Fourth Embodiment

Figure 6A:
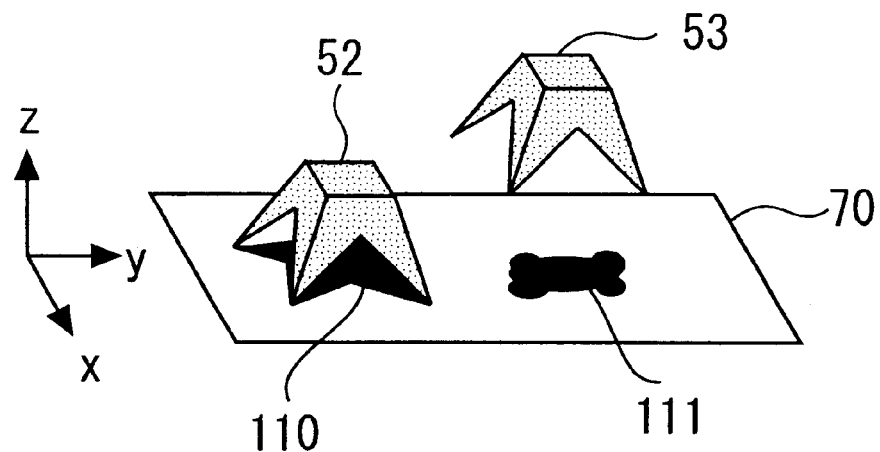
FIG. 6A and FIG. 6B show examples of shadow objects generated according to Fourth Embodiment.
Figure 6B:
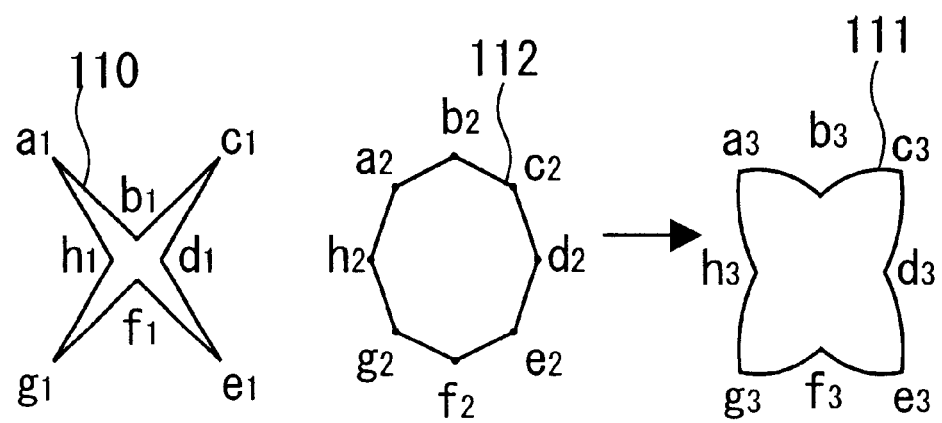

FIG. 6A and FIG. 6B show examples of shadow objects generated according to Fourth Embodiment. The parts in FIG. 6A and FIG. 6B assigned the same reference numerals as those in FIG. 3 indicate the same components, and therefore explanations thereof will be omitted.

In FIG. 6A, reference numerals 52 and 53 denote three-dimensional bodies; 110: a shadow object of the three-dimensional body 52; and 111: a shadow object of the three-dimensional body 53. As shown in FIG. 6A, in Fourth Embodiment, the three-dimensional body 52 contacts the topographical object 70 and the three-dimensional body 53 is floating above the topographical object 70. When the three-dimensional body 50 etc. contacts the topographical object 70 in Embodiments 1 to 3 above, the shadow object such as the three-dimensional body 50 is expressed with a simple figure such as ellipse. Fourth Embodiment can however generate the shadow object 110 of the three-dimensional body 52 contacting the topographical object 70 based on the shadow through parallel projection. This allows the shape of the shadow object 110 to be expressed in detail. On the other hand, the shadow object 111 of the three-dimensional object 53 floating above the topographical object 70 can be displayed interpolated into a nearly circular shape by combining the shadow object 110 with a desired polygon. As a result, when the three-dimensional object 52 contacts the topographical object 70, it is possible to express the shadow with the detailed shadow object 110 through parallel projection, and as the three-dimensional object 52 goes apart from the topographical object 70, it is possible to express the shadow by making the shape of the shadow object 111 closer to a circle.

FIG. 6B shows xy plan views of the shadow objects 110 and 111 in FIG. 6A to explain the interpolation method described above. As shown in FIG. 6B, the shadow object 110 is assumed to have 8 vertices of a1 to h1. Then, as the above described desired polygon, suppose an inscribed polygon 112 having the same number of vertices a2 to h2 corresponding to the vertices a1 to h1 of the shadow object 110 within a circle containing the shadow object 110. Then, by combining the shadow object 110 and the inscribed polygon 112 and interpolating the respective vertices, it is possible to generate a shadow object 111 having vertices a3 to h3. While the shadow object 111 can be calculated and created gradually as the three-dimensional body 53 goes apart from the topographical object 70, it is also possible to create a plurality of shadow objects 11 etc. beforehand according to the distance between the three-dimensional body 53 and the topographical object 70 and gradually display these shadow objects. It is further possible to smoothly display the shadow objects displayed in the respective stages according to the distance by interpolating between the plurality of shadow objects created beforehand. The shadow object generation method according to this Fourth Embodiment is a method of creating shadow objects effective for the case when, for example, a character having a complicated shape jumps from its position touching the topographical object 70.

As stated above, when a three-dimensional body contacts a topographical object, Fourth Embodiment can express shadows using a detailed shadow object using parallel projection. As the three-dimensional body goes apart from the topographical object, it is possible to express the shadow object by interpolating a combination of the original detailed shadow object and a desired polygon and thereby gradually making the shape of the shadow object closer to a circle. This makes it possible to express a natural shadow according to the distance between the three-dimensional body and topographical object and generate a shadow object with less load on the CPU by providing a simple figure.

Fifth Embodiment

Figure 7A:
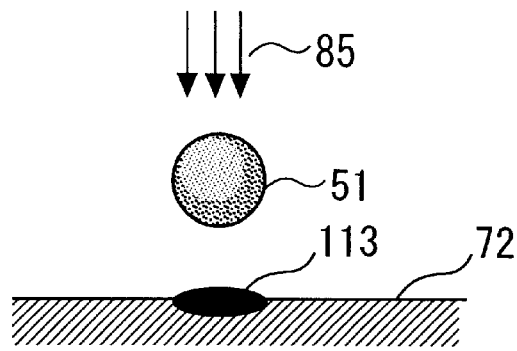
FIG. 7A and FIG. 7B show examples of shadow objects generated according to Fifth Embodiment.
Figure 7B:
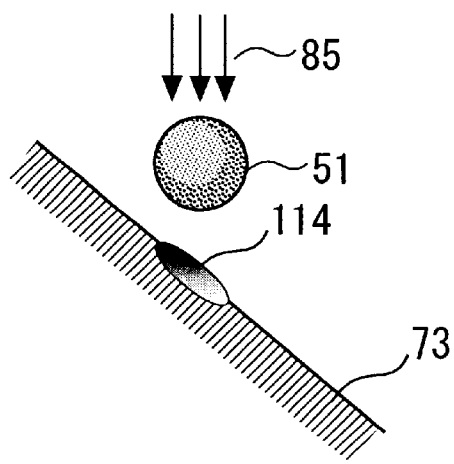

FIG. 7A and FIG. 7B show examples of shadow objects generated according to Fifth Embodiment. The parts in FIG. 7A and FIG. 7B assigned the same reference numerals as those in FIG. 3 indicate the same components, and therefore explanations thereof will be omitted.

In FIG. 7A and FIG. 7B, reference numeral 85 denotes a parallel light beam; 72: a topographical object perpendicular to the parallel light beam 85; 73: a topographical object with a desired angle not perpendicular to the parallel light beam 85; 113: a shadow object corresponding to the three-dimensional body 51 on the topographical object 72; and 114: a shadow object corresponding to the three-dimensional body 51 on the topographical object 73.

First Embodiment to fourth Embodiment above, except part of Third Embodiment, assume that the topographical object 72 etc. is perpendicular to the parallel light beam 85 as shown in FIG. 7A. However, in Fifth Embodiment as shown in FIG. 7B when the topographical object 73 has a desired angle which is not perpendicular to the parallel beam 85, it is possible to generate the shadow object 114 of the three-dimensional body 51 obliquely projected according to a desired angle. In this case, as the angle between the topographical object 73 and the parallel light beam 85 comes closer to 90 degrees, that is, as the gradient of the topographical object 72 comes closer to a right angle, the degree of semitransparency of the shadow object 114 can be increased.

As stated above, according to Fifth Embodiment in addition to the respective embodiments above, when the topographical object has a desired angle, which is not perpendicular to the parallel beam, it is possible to generate the shadow object of the three-dimensional body obliquely projected according to the desired angle above. As the gradient of the topographical object comes closer to a right angle, the degree of semitransparency of the shadow object can be increased. This makes it possible to express a natural shadow according to the angle between a three-dimensional body and topographical object.

Sixth Embodiment

Figure 8:
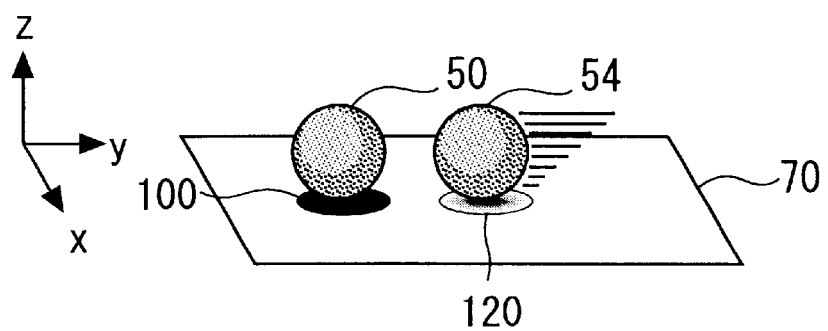
FIG. 8 shows examples of shadow objects generated according to Sixth Embodiment of the present invention.

FIG. 8 shows examples of shadow objects generated according to Sixth Embodiment of the present invention. The parts in FIG. 8 assigned the same reference numerals as those in FIG. 3 indicate the same components, and therefore explanations thereof will be omitted.

In FIG. 8, reference numeral 50 denotes a stationary three-dimensional body that contacts a topographical object 70; 54: a moving three-dimensional body that contacts the topographical object 70; and 120: a shadow object of the three-dimensional body 54.

First Embodiment to fifth Embodiment above assume that the three-dimensional body 50 is stationary with respect to the topographical object 70 etc. as shown in FIG. 8. However, in Sixth Embodiment, as shown in FIG. 8, when the three-dimensional body 54 is moving in a desired direction with respect to the topographical object 70, for example, in the negative direction on the y-axis in a virtual space, it is possible to express the shadow object 120 with its density reduced. That is, it is possible to express the shadow object 100 of the stationary three-dimensional body 50 as non-transparent and express the shadow object 120 of the moving three-dimensional body 54 with its density reduced. The above explanation describes the case where the three-dimensional bodies 50 and 54 contact the topographical object, but they can also be apart from the topographical object by a desired distance. In this case, the same expression methods in the respective embodiments above can be used to express the shadow object.

As stated above, according to Sixth Embodiment in addition to the respective embodiments above, when a three-dimensional body is stationary with respect to a topographical object, it is possible to generate its shadow object non-transparent, and when the three-dimensional body is moving with respect to the topographical object, generate the shadow object with its density reduced. This makes it possible to express a natural shadow according to the speed between the three-dimensional body and topographical object.

Seventh Embodiment

Figure 9A:
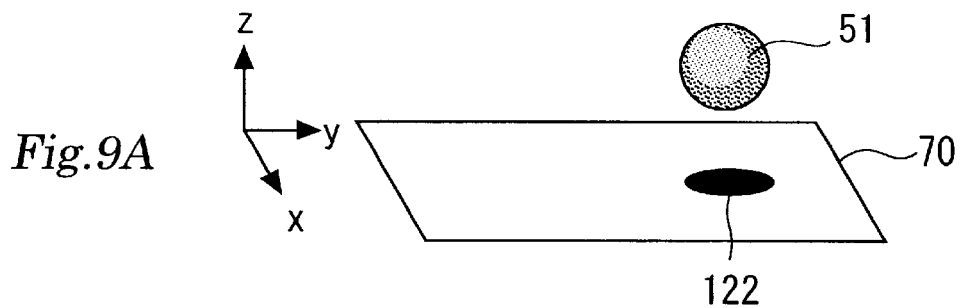
FIG. 9A, FIG. 9B and FIG. 9C show examples of shadow objects generated according to Seventh Embodiment.
Figure 9B:
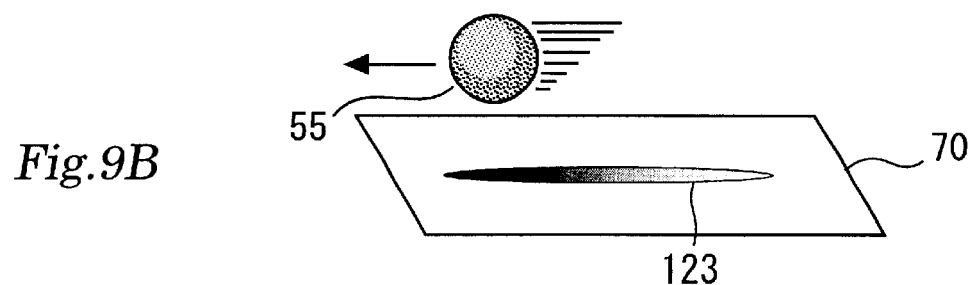
Figure 9C:
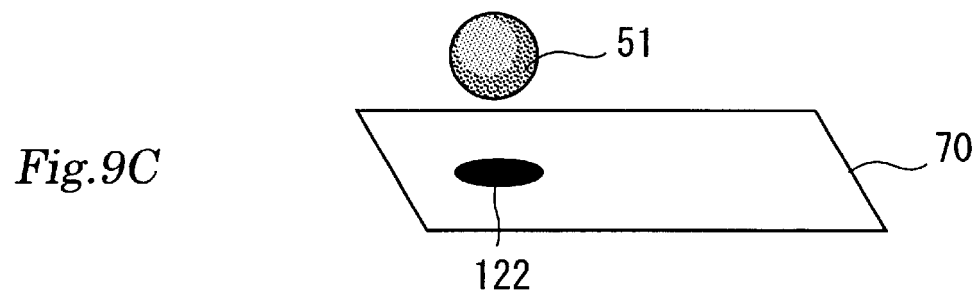

FIG. 9A, FIG. 9B and FIG. 9C show examples of shadow objects generated according to Seventh Embodiment. The parts in FIG. 9A, FIG. 9B and FIG. 9C assigned the same reference numerals as those in FIG. 3 indicate the same components, and therefore explanations thereof will be omitted.

In FIG. 9A and FIG. 9C, reference numeral 51 denotes a stationary three-dimensional body above a topographical object 70; 122: a shadow object of the three-dimensional body 51 and in FIG. 9B, reference numeral 55 denotes a moving three-dimensional body above the topographical object 70; 123: a shadow object of the three-dimensional body 55. FIG. 9A to FIG. 9C show the process whereby the three-dimensional body 51 that has been initially stationary moves in a desired direction, for example, in the negative direction on the y-axis in a virtual space and stops again.

Sixth Embodiment above expresses the shadow object 120 of the moving three-dimensional body 54 with its density reduced. In this Seventh Embodiment, however, it is possible to express the shadow of the three-dimensional body 55 moving in a desired direction extended over the distance it moves in the desired direction as shown by the shadow object 123. It is possible to express the shadow object 122 of the stationary three-dimensional body 51 as non-transparent and express the shadow object 123 of the moving three-dimensional body 55 with reduced density. Since the state shown in FIG. 9B actually lasts for an extremely short time, for example, 1/60 sec, this embodiment can express the shadow object in a more energetic way rather than displaying a plurality of non-transparent shadow objects 122 in the moving direction and express the shadow object 123 with less processing load for display.

As stated above, according to Seventh Embodiment, it is possible to express the shadow object 122 of the stationary three-dimensional body 51 as non-transparent and the shadow object 123 of the moving stationary three-dimensional body 55 with reduced density. This makes it possible to express a more natural shadow according to the speed between the three-dimensional body and topographical object and generate a shadow with less load on the CPU by providing a simple figure.

Eighth Embodiment

Figure 10A:
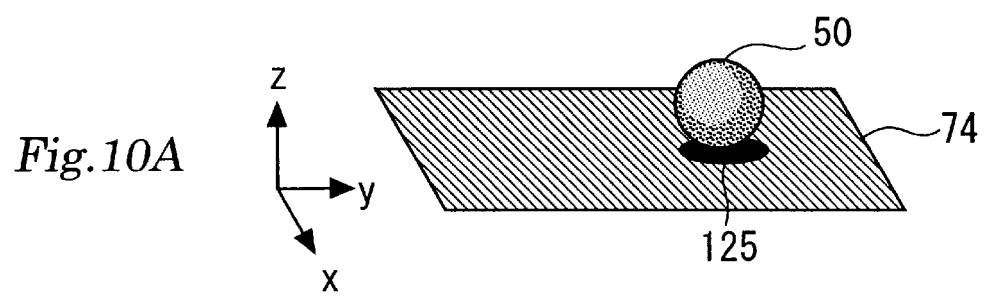
FIG. 10A and FIG. 10B show examples of shadow objects generated according to Eighth Embodiment.
Figure 10B:
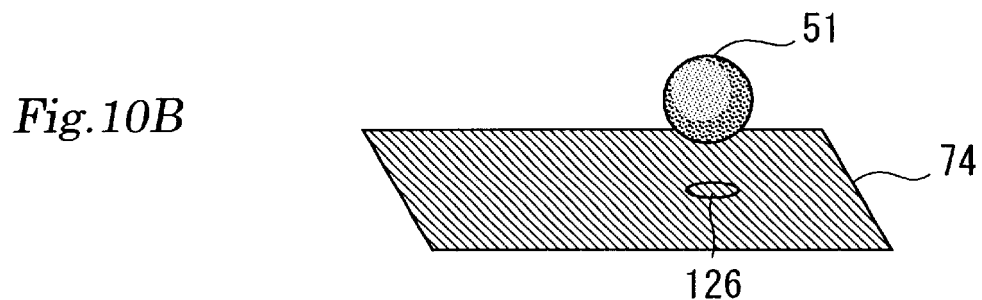

FIG. 10A and FIG. 10B show examples of shadow objects generated according to Eighth Embodiment. The parts in FIG. 10A and FIG. 10B assigned the same reference numerals as those in FIG. 3 indicate the same components, and therefore explanations thereof will be omitted.

In FIG. 10A and FIG. 10B, reference numeral 74 denotes a topographical object in a desired color (ground color); 125: a shadow object of a three-dimensional body 50 that contacts the topographical object 74; and 126: a shadow object of a three-dimensional body 51 that is above the topographical object 74. As shown in FIG. 10A, when the three-dimensional body 50 contacts the topographical object 74, the shadow object 125 is expressed in black and when the three-dimensional body 51 does not contact the topographical object 74, the shadow object 126 can be expressed with the color made close to the ground color of the topographical object 74. For example, when the ground color is brown, it is possible to express the color of the shadow object 126 made closer to brown when the three-dimensional body 51 does not contact the topographical object 74. As a result, as the three-dimensional body 51 goes apart from the topographical object 74, it is possible to express the color of the shadow object 126 made closer to the ground color. The three-dimensional body 50 or 51 can be moving in any direction in a virtual space, for example, in the negative direction on the y-axis.

As stated above, according to Eighth Embodiment, when the three-dimensional body contacts the topographical object, it is possible to express the shadow object in black, and when the three-dimensional body does not contact the topographical object, express the shadow object with its color made closer to the ground color of the topographical object. This makes it possible to express a more natural shadow according to the distance between the three-dimensional body and the topographical object.

Ninth Embodiment

Figure 11:
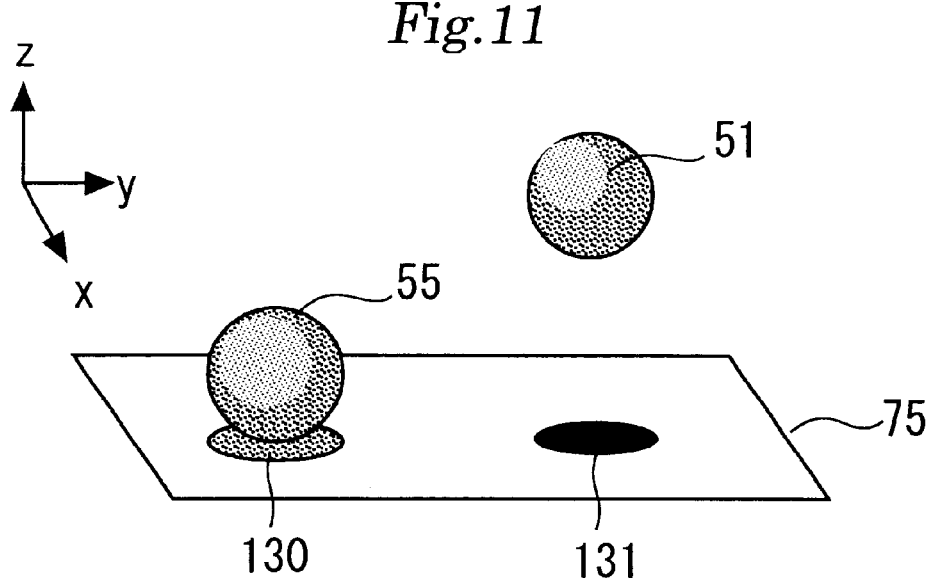
FIG. 11 shows examples of shadow objects generated according to Ninth Embodiment.

FIG. 11 shows examples of shadow objects generated according to Ninth Embodiment. The parts in FIG. 11 assigned the same reference numerals as those in FIG. 3 indicate the same components, and therefore explanations thereof will be omitted.

In FIG. 11, reference numeral 75 denotes a topographical object in a ground color easy to reflect other colors, for example, white color; 55: a three-dimensional body that contacts the topographical object 75 in a desired color; 130: a shadow object of the three-dimensional body 55; and 131: a shadow object of a three-dimensional body 51 which is above the topographical object 75.

As shown in FIG. 11, when the three-dimensional body 55 in a desired color contacts the topographical object 75 in a ground color easy to reflect other colors such as white, it is possible to make the color of the shadow object 130 the same as the desired color of the three-dimensional body 55. When the three-dimensional body 51 does not contact the topographical object 75, it is possible to make the color of the shadow object 131 closer to black. As a result, it is possible to express the state in which the color of the three-dimensional body 55 is reflected in the topographical object 75. The three-dimensional body 55 or 51 can be moving in any direction in a virtual space, for example, in the negative direction on the y-axis.

As stated above, according to Ninth Embodiment, when a three-dimensional body in a desired color contacts a topographical object in a ground color easy to reflect other colors such as white, it is possible to make the color of the shadow object the same as the desired color of the three-dimensional body. When the three-dimensional body does not contact the topographical object, it is possible to express the shadow object with its color made closer to black, making it possible to reflect the color of the three-dimensional body in the topographical object and express a more natural shadow according to the ground color of the topographical object.

Tenth Embodiment

Figure 12:
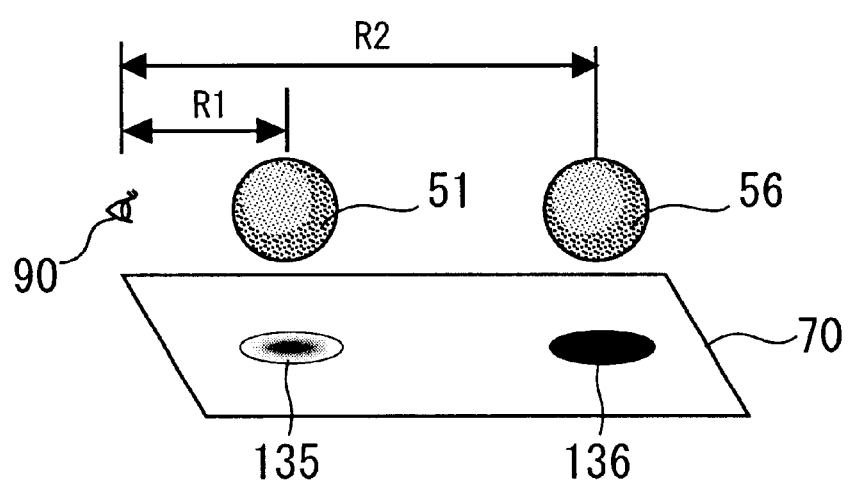
FIG. 12 shows examples of shadow objects generated according to Tenth Embodiment.

FIG. 12 shows examples of shadow objects generated according to Tenth Embodiment. The parts in FIG. 12 assigned the same reference numerals as those in FIG. 3 indicate the same components, and therefore explanations thereof will be omitted.

In FIG. 12, reference numeral 90 denotes a predetermined observing point set in a virtual space; 56: a three-dimensional body above a topographical object 70; 135: a shadow object of the three-dimensional body 51; 136: a shadow object of the three-dimensional body 56; R1: a distance between the observing point 90 and the three-dimensional body 51; and R2: a distance between the observing point 90 and the three-dimensional body 56.

As shown in FIG. 12, when the three-dimensional body 51 is within a predetermined range from the observing point 90, for example, within a distance R1, the shadow object 135 is generated as semitransparent and when the three-dimensional body 51 is outside a predetermined range from the observing point 90, for example, in a distance R2 as in the case of the three-dimensional body 56, the shadow object can be expressed in black. This makes it possible to express the shadow object 135 more semitransparent as the three-dimensional body 51 comes closer to the observing point 90 and express the shadow object 135 closer to black as the three-dimensional body 56 goes apart from the observing point 90.

As stated above, according to Tenth Embodiment, when a three-dimensional body is within a predetermined range from an observing point, it is possible to generate its shadow object semitransparent and when the three-dimensional body is outside the predetermined range from the observing point 90, for example, in a distance R2 as in the case of the three-dimensional body 56, it is possible to express the shadow object in black. This makes it possible to express a more natural shadow according to the distance from the observing point.

Eleventh Embodiment

Figure 13A:
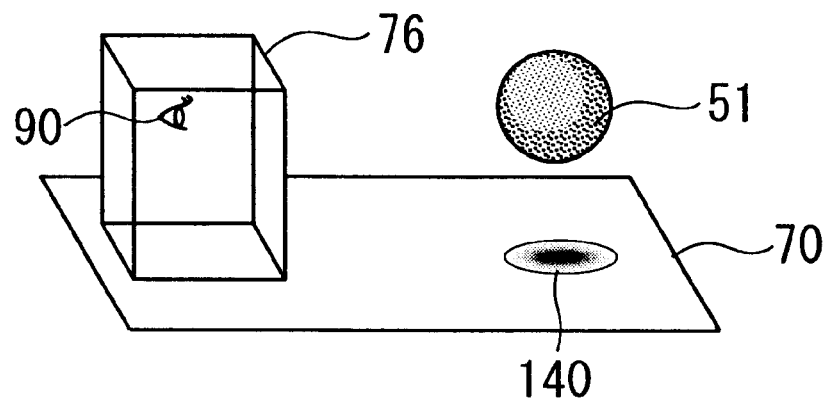
FIG. 13A and FIG. 13B show examples of shadow objects generated according to Eleventh Embodiment.
Figure 13B:
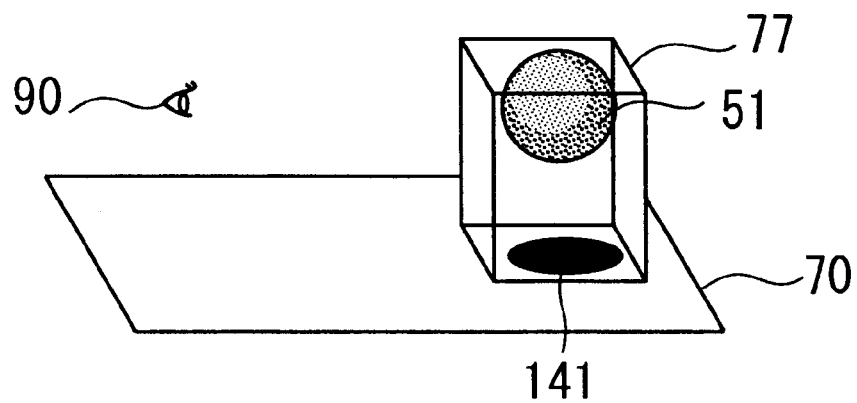

FIG. 13A and FIG. 13B show examples of shadow objects generated according to Eleventh Embodiment. The parts in FIG. 13A and FIG. 13B assigned the same reference numerals as those in FIG. 3 or FIG. 12 indicate the same components, and therefore explanations thereof will be omitted.

In FIG. 13A, reference numeral 76 denotes an environment surrounding an observing point 90; 140: a shadow object of a three-dimensional body 51 above a topographical object 70; and in FIG. 13B, reference numeral 77 denotes an environment surrounding the three-dimensional body 51; 141: a shadow object of the three-dimensional body 51.

As shown in FIG. 13A, in the case where the environment 76 of the observing point 90 is a dark environment such as a tunnel, the shadow object 140 of the three-dimensional body 51 which is in a relatively clear state outside the surrounding environment 76 can be displayed with the density, the degree of semitransparency or color that can be viewed relatively clear from the observing point 90. On the other hand, as shown in FIG. 13B, in the case where the surrounding environment 77 of the three-dimensional body 51 is a dark environment such as a tunnel, the shadow object 141 of the three-dimensional body 51 viewed from the observing pint 90 in a relatively clear state outside the surrounding environment 77 can be displayed with the density, degree of semitransparency or color that can be viewed relatively dark.

As stated above, according to Eleventh Embodiment, it is possible to express the shadow object with the density, degree of semitransparency or color according to the situation of light or shade in the environment surrounding the three-dimensional body and the situation of light or shade in the environment surrounding the observing point. Thus, it is possible to express a more natural shadow according to the surrounding environment in which the observing point and three-dimensional body are placed.

Twelfth Embodiment

Figure 14:
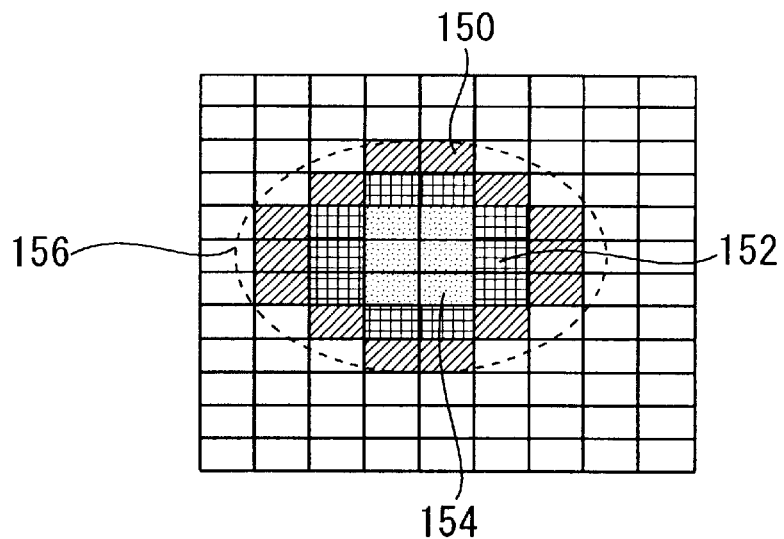
FIG. 14 shows examples of shadow objects generated according to Twelfth Embodiment.

FIG. 14 shows examples of shadow objects generated according to Twelfth Embodiment. In FIG. 14, reference numeral 156 denotes a shadow object with desired density; 150, 152 and 154: pixels with different densities that make up a shadow object 156. The density increases in the order of pixels 150, 152 and 154.

When a shadow object is created, it has been explained in First Embodiment above that it is possible to generate the shadow object by decreasing its density toward the periphery. As an example of the method, it is possible to use a method of creating the shadow object 156 using a plurality of pixels 150, 152 and 154 etc. with different densities as shown in FIG. 14. That is, when the three-dimensional object 51 etc. is at a predetermined distance from the topographical object 70 etc., it is possible to create the shadow object 156 having the pixels 150, 152 and 154 whose density becomes thinner toward the periphery. The density can also be set dot by dot instead of pixel by pixel.

Then, an example of another method of creating the shadow object whose density becomes thinner toward the periphery will be shown. First, the following Equation 1 or Equation 2 can be conceived as an example of the relationship in density (C) between a three-dimensional object at a predetermined distance (H) from the topographical object and the shadow object 156 etc.

[Equation 1]

$$A = 1/(H+1) \qquad \text{Equation 1}$$

[Equation 2]

$$A = \exp(-H) \qquad \text{Equation 2}$$

Equation 1 and Equation 2 are merely Equations for illustrative purposes and it is naturally possible to use other Equations.

Figure 15A:
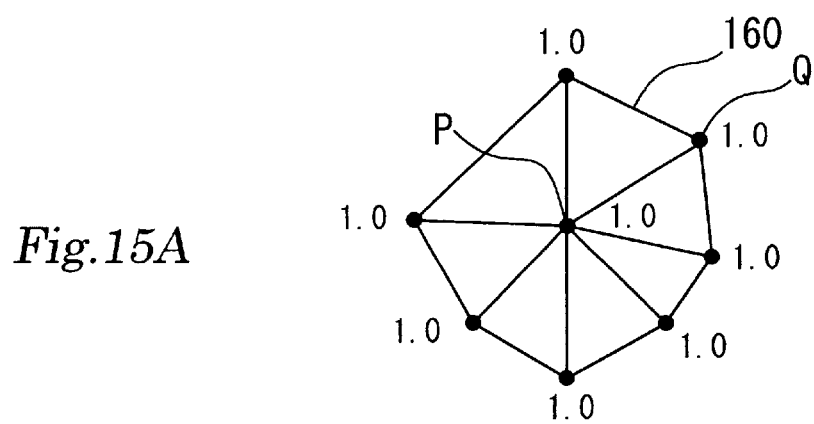
FIG. 15A shows a case where the three-dimensional body contacts the topographical object (H=0) and FIG. 15B shows a case where the three-dimensional body exists at a desired distance H from the topographical object.
Figure 15B:
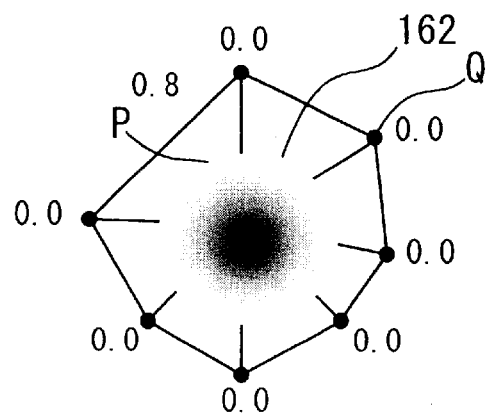

FIG. 15A shows a case where the three-dimensional body contacts the topographical object (H=0) and FIG. 15B shows a case where the three-dimensional body exists at a desired distance H from the topographical object. In FIG. 15A and FIG. 15B, reference numerals 160 and 162 denote shadow objects with different distances from the topographical object; reference character P denotes a central point of the shadow object 160; and Q denotes one of vertices of the shadow object 160.

As shown in FIG. 15A, this method determines density A according to distance H calculated from Equation 1 or Equation 2 above for the central point and each vertex Q etc. of the shadow object 160. Since FIG. 15A shows the case where the three-dimensional body contacts the topographical object, density A becomes 1.0 at the respective points. Here, the black color is omitted because vertex P etc. will become invisible if the shadow object 160 is displayed in black.

Then, if density A at desired distance H is calculated from Equation 1 or Equation 2 above, density A is 0.8 for example. Suppose this density 0.8 as the density at central point P and the density at vertex Q etc. is 0.0. Density A of the shadow object 162 can be gradually reduced in such a way that density is reduced from 0.8 at central point P to 0.0 at peripheral vertex Q etc.

As stated above, according to Twelfth Embodiment, it is possible to generate the shadow object using a plurality of pixels differing in density, and therefore when the three-dimensional object is at a predetermined distance from the topographical object, it is possible to generate the shadow object 156 having the pixels 150, 152 and 154 whose density becomes thinner toward the periphery.

Thirteenth Embodiment

In the embodiment above, suppose a case where the three-dimensional body has at least two legs (reference legs), for example, where the three-dimensional body is a character such as a man having right and left legs. FIG. 16A, FIG. 16B, FIG. 16C and FIG. 16D show examples of generating shadow objects according to Thirteenth Embodiment. In FIG. 16A to FIG. 16D, reference numeral 57 denotes a character such as a man; 70: a topographical object on which the character 57 stands; 170 and 171: shadow objects of the character 57 displayed on the topographical object 70.

Figure 16A:
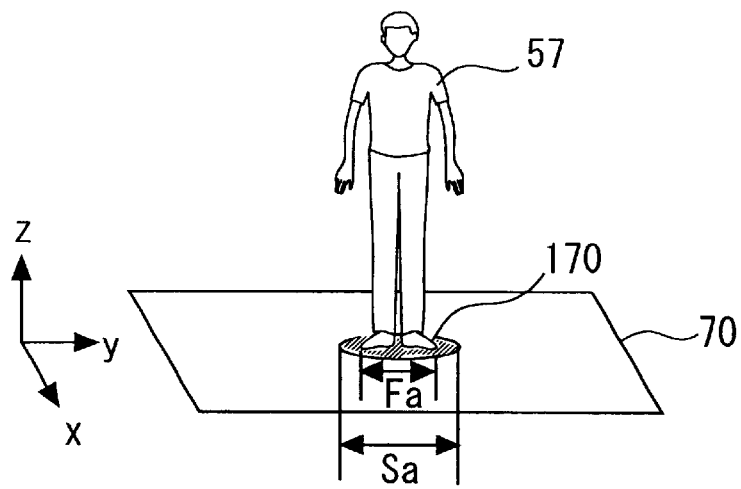
FIG. 16A, FIG. 16B, FIG. 16C and FIG. 16D show examples of generating shadow objects according to Thirteenth Embodiment.
Figure 16B:
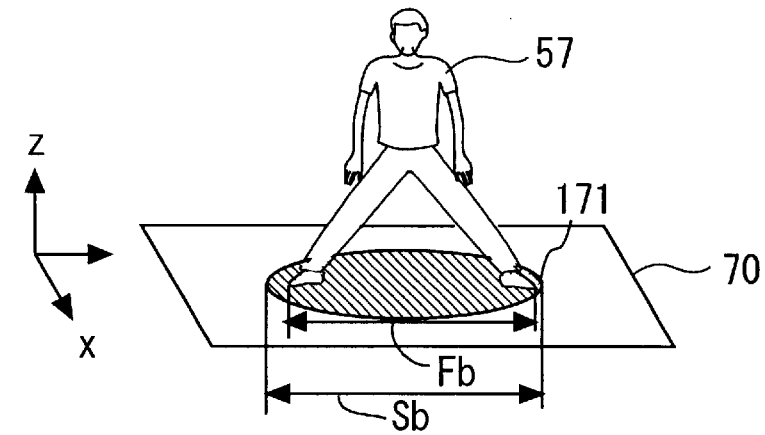

As shown in FIG. 16A, reference character Fa denotes a distance between two legs (width between the edges of the reference legs before the reference legs operate) which is the basis when the character 57 stands with the legs put together; Sa is a scale (scale of a reference shadow object) of the shadow object 170 which is the basis when the character 57 stands with the legs put together. Here, suppose the character 57 moves the legs, for example, character 57 spreads the legs apart. As shown in FIG. 16B, when the character 57 spreads the legs apart in the y-axis direction, the distance between the legs (width between the edges of the reference legs after the reference legs operate) becomes Fb and the scale (scale of the shadow object after the reference leg has moved) of the shadow object 171 when the character 57 spreads the legs apart becomes Sb. The relationship between Sb, Sa, Fa and Fb above can be expressed as shown in Equation 3 below (scale determining means).

[Equation 3]

$$Sb = SaFb/Fa \qquad \text{Equation 3}$$

Using Sb obtained as described above, it is possible to generate the shadow object 171 after the legs have moved. The shadow object 171 is expanded not only in the leg width direction (y-axis direction) but also in the x-axis direction at the same rate as in the y-axis direction. The shadow object 170 or 171 can be generated based on the reference point right below the waist (predetermined reference point), but can also be created, as will be explained in Fourteenth Embodiment later, based on the reference points obtained using the waist and both legs (post-motion shadow object generating means). The density of the shadow object 171 can be made lighter than the shadow object 170 or semi-transparent. In this explanation, the character 57 is a man, but can also be a quadruped such as dog and cat, or can also be a myriapod such as centipede. In these cases, characteristic legs can be selected as the reference legs.

Figure 16C:
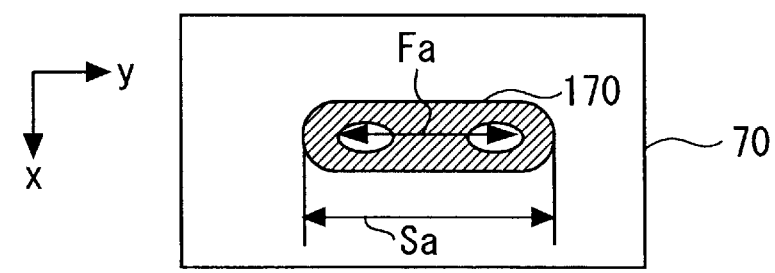
Figure 16D:
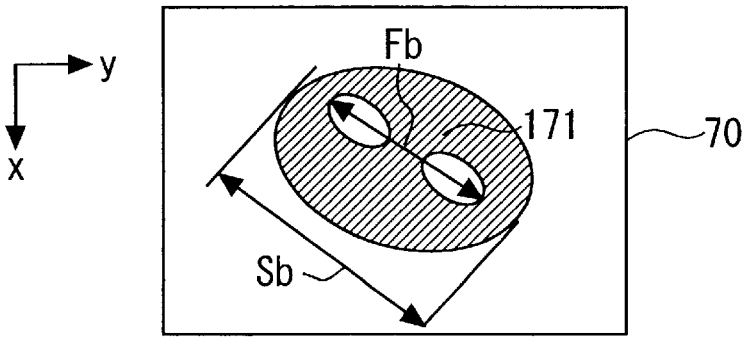

FIG. 16C and FIG. 16D show the shadow object 170 and the shadow object 171 before and after the legs of the character 57 move on the xy plane, respectively. When the legs move not on the y-axis but the character 57 moves the left leg forward in the x-axis direction as shown in FIG. 16D, it is also possible to determine the scale Sb of the shadow object in the same way. The shadow object 170 extends not only in the direction of the motion (x-axis direction) but also in both the x-axis direction and y-axis direction at the same rate. It is naturally possible to expand the shadow object only in the direction of the motion (x-axis direction).

Figure 17:
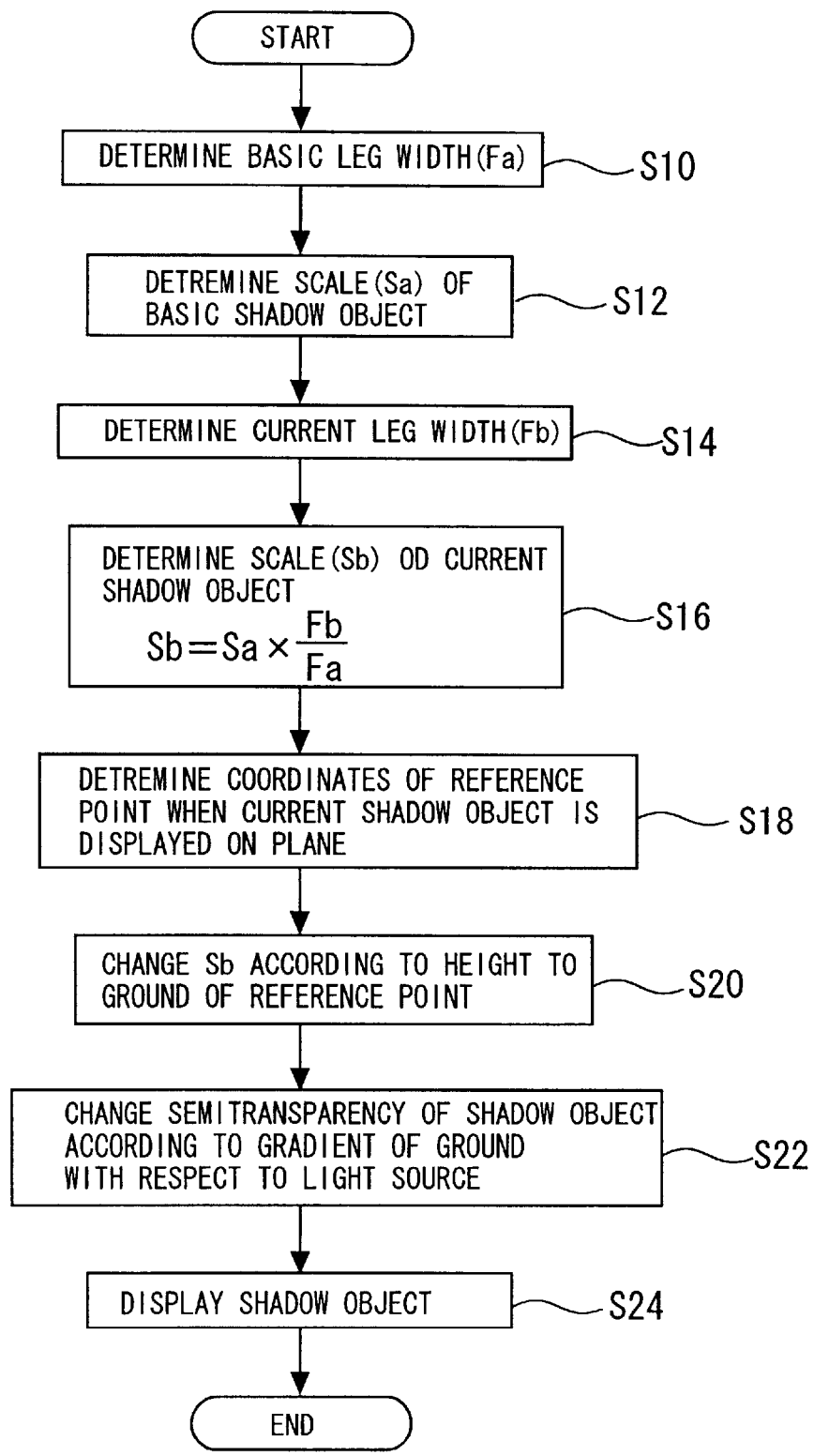
FIG. 17 shows a flow chart to determine the scale of the shadow object after the motion according to Thirteenth Embodiment of the present invention.

FIG. 17 shows a flow chart to determine the scale of the shadow object after the motion according to Thirteenth Embodiment of the present invention.

As shown in FIG. 17, the leg width (Fa) to be the reference is determined first (step S10), followed by the scale (Sa) of the shadow object to be the reference (step S12). Then, the current leg width (Fb) after the legs have moved is determined (step S14). Based on the data above, the scale (Sb) of the current shadow object after the legs have moved is determined using Equation 3 (step S16). The above reference points are determined to display the current shadow object after the legs have moved (step S18). Details will be explained in next Fourteenth Embodiment. Scale Sb is corrected according to the height to ground of the obtained reference point (z coordinate of the reference point in a virtual space) as appropriate (step S20). As explained in the embodiment above, this is associated with the fact that the scale of the shadow object is reduced as the height to ground increases. When the ground surface (topographical object) is inclined with respect to the light source, the density and the degree of semitransparency etc. of the shadow object are changed according to the gradient (step S22). Lastly, the shadow is displayed (step S24).

As stated above, according to Thirteenth Embodiment in addition to the embodiments above, even if the character has at least two legs (reference legs) and moves these legs, it is possible to determine the scale of the shadow object after the motion and display the shadow object based on desired reference points. This allows a more natural shadow to be expressed according to the motion of the character.

Fourteenth Embodiment

Figure 18:
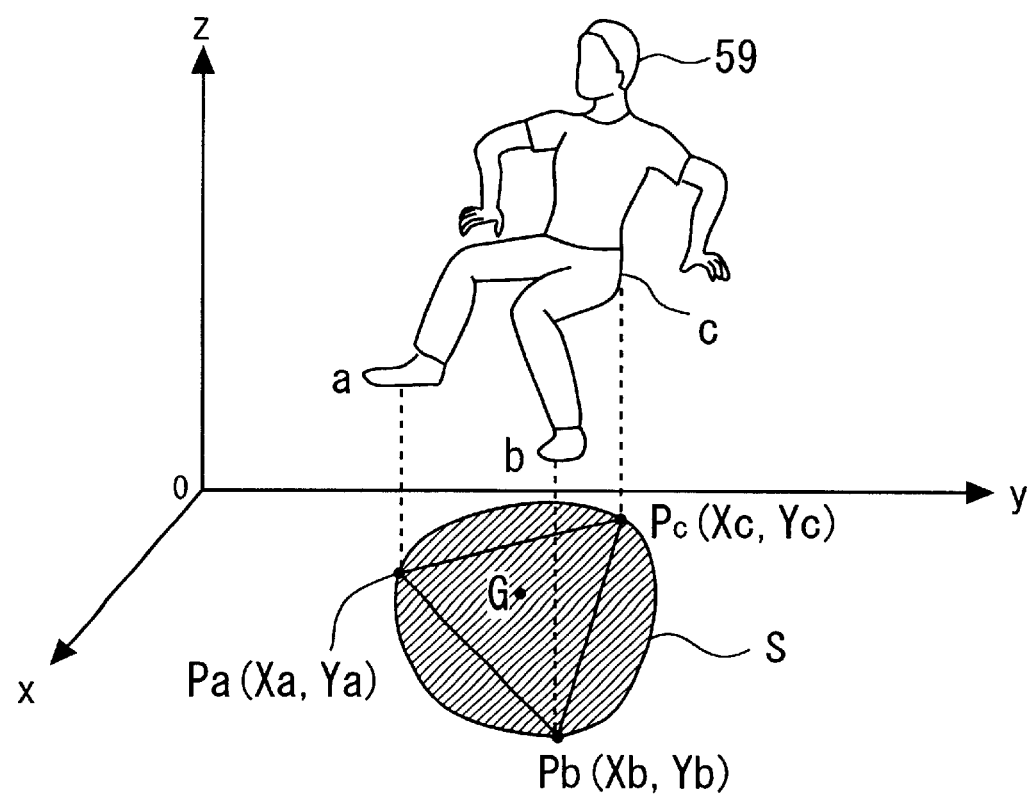
FIG. 18 exemplarily shows a state after the character 59 put together the right leg a and left leg b first (not shown) and then spreads both legs apart.

FIG. 18 shows examples of shadow objects generated according to Fourteenth Embodiment of the present invention. In FIG. 18, reference numeral 59 denotes a character in a virtual space; reference character a denotes the tip of the right leg (right toe) of the character 59; b denotes the left leg of the character 59; c denotes the lumbar part of the character 59; Pa (Xa, Ya) denotes a projection point and coordinates of the right leg a on the xy plane; Pb (Xb, Yb) denotes a projection point and coordinates of the left leg b on the xy plane; Pc (Xc, Yc) denotes a projection point and coordinates of the lumbar part c on the xy plane; S: a shadow object of the character 59; G: a reference point of the shadow object.

FIG. 18 exemplarily shows a state after the character 59 put together the right leg a and left leg b first (not shown) and then spreads both legs apart. As stated above, the shadow object S can also be created based on a projection point Pc right below the lumbar part c, but this Fourteenth Embodiment can generate the shadow object S based on a reference point G obtained by assigning predetermined weights to the projection point Pc of the lumber part c parallel-projected onto the topographical object (xy plane), the projection point Pa corresponding to the right leg a and the projection point Pb corresponding to the left leg b (post-motion shadow object generating means). As the reference point G, the center of gravity of the projection points Pa, Pb and Pc, for example, can be used. However, the reference point is not limited to the center of gravity, but various reference points can be used by assigning appropriate weights.

As stated above, according to Fourteenth Embodiment, it is possible to create the shadow object S based on the reference point G obtained by assigning predetermined weights to the projection point Pc of the lumber part c parallel-projected onto the topographical object (xy plane), the projection point Pa corresponding to the right leg a and the projection point Pb corresponding to the left leg b. Thus, it is possible to express a more natural shadow according to the motion of the character compared to the case where the projection point Pc of the lumber part c is used as a reference point.

Fifteenth Embodiment

It goes without saying that the object of the present invention can also be attained by supplying a recording medium that records a computer program providing the functions of the respective embodiments described above to the image generation apparatus of the present invention and making the computer CPU 51 of the image generation apparatus read and execute the computer program stored in the recording medium set in the recording medium section 60 etc. In this case, the computer program read from the above recording medium itself implements the new functions of the image generation apparatus of the present invention and the recording medium storing the computer program constitutes the present invention. As the recording medium that records the computer program, a CD-ROM, floppy disk, hard disk, ROM, memory card and optical disk etc. can be used.

As stated above, according to Fifteenth Embodiment, the object of the present invention can also be attained by supplying a recording medium that records a computer program providing the functions of the respective embodiments above to the image generation apparatus of the present invention and making the computer CPU 1 of the image generation apparatus read and execute the computer program stored in the recording medium.

The computer program that implements the functions of the respective embodiments above can also be supplied to the image generation apparatus of the present invention through the communication control section 25 from an external computer over a network.

As described above, the image generation apparatus, method and recording medium of the present invention can provide an image generation apparatus, method and recording medium capable of expressing a natural shadow with respect to changes of the motion of a character and generating a shadow with less load on the CPU by changing the density, degree of transparency and scale of the shadow object according to the positional relationship, speed relationship between a three-dimensional body and topographical object or environment surrounding an observing point etc.

The present invention can further provide an image generation apparatus, method and recording medium capable of generating a lively shadow according to the motion of the character even if the character moves such as spreading his/her legs apart by determining the scale of the shadow object after the motion and generating a shadow object based on a desired reference point.

In the image generation apparatus, in the case where the three-dimensional body does not contact the topographical object, the shadow object generating means may increase the degree of transparency of the shadow object as the distance between the three-dimensional body and the topographical object increases and may decrease the degree of transparency of the shadow object as the distance between the three-dimensional body and the topographical object decreases.

In the image generation apparatus, in the case where the three-dimensional body contacts the topographical object, the shadow object generating means may generate a shadow object in black.

In the image generation apparatus, in the case where the three-dimensional body contacts the topographical object, the shadow object generating means may generate a shadow object based on the shadow by parallel projection on the topographical object of the three-dimensional body and in the case where the three-dimensional body does not contact the topographical object, may contract the shadow by the parallel projection as the distance between the three-dimensional body and the topographical object increases.

In the image generation apparatus, in the case where the three-dimensional body contacts the topographical object, the shadow object generating means may generate a shadow object based on the shadow by parallel projection on the topographical object of the three-dimensional body and in the case where the three-dimensional body does not contact the topographical object, may increase the degree of transparency of the shadow object and contracts the shadow by parallel projection as the distance between the three-dimensional body and the topographical object increases, and may decrease the degree of transparency of the shadow object and expands the shadow by parallel projection as the distance between the three-dimensional body and the topographical object decreases.

In the image generation apparatus, in the case where the three-dimensional body contacts the topographical object, the shadow object generating means may generate a shadow object based on the shadow by parallel projection on the topographical object of the three-dimensional body and in the case where the three-dimensional body does not contact the topographical object, may generate a shadow object by perspective projection projected from the center of a predetermined projection line in the virtual space.

In the image generation apparatus, in the case where the three-dimensional body contacts the topographical object, the shadow object generating means may generate a shadow object by parallel projection on the topographical object of the three-dimensional body and in the case where the three-dimensional body does not contact the topographical object, may generate a shadow object by interpolating the shadow object rounder than the shadow by parallel projection as the distance between the three-dimensional body and the topographical object increases.

In the image generation apparatus, in the case where the normal of the topographical object and the projection line of parallel projection do not form a right angle, the shadow object generating means may diagonally project and create the shadow object onto the topographical object according to the angle and increases the degree of semitransparency of the shadow object as the angle comes closer to the right angle.

In the image generation apparatus, in the case where the three-dimensional body is moving with respect to the topographical object, the shadow object generating means may increase the degree of transparency of the shadow object as the moving speed of the three-dimensional body increases and may decrease the degree of transparency of the shadow object as the moving speed of the three-dimensional body decreases.

In the image generation apparatus, in the case where the three-dimensional body is stationary with respect to the topographical object, the shadow object generating means may generate the shadow object in black.

In the image generation apparatus, in the case where the three-dimensional body is moving with respect to the topographical object, the shadow object generating means may decrease the density of the shadow object and generates the shadow object including the trail of the shadow object.

In the image generation apparatus, in the case where the three-dimensional body contacts the topographical object or the three-dimensional body is moving with respect to and in contact with the topographical object, the shadow object generating means may generate the shadow object in black and in the case where the three-dimensional body does not contact the topographical object or the three-dimensional body is moving with respect to the topographical object without contacting the topographical object, may display the shadow object by making the color of the shadow object closer to the color of the topographical object as the distance between the three-dimensional body and the topographical object increases.

In the image generation apparatus, in the case where the three-dimensional body contacts the topographical object or the three-dimensional body is moving with respect to and in contact with the topographical object, the shadow object generating means may display the shadow object in the color of the three-dimensional body and in the case where the three-dimensional body does not contact the topographical object or the three-dimensional body is moving with respect to the topographical object without contacting the topographical object, may display the shadow object by making the color of the shadow object closer to black as the distance between the three-dimensional body and the topographical object increases.

In the image generation apparatus, in the case where the three-dimensional body is within a predetermined range from the observing point, the shadow object generating means may generate the shadow object semitransparent and in the case where the three-dimensional body is outside the predetermined range from the observing point, may display the shadow object in black.

In the image generation apparatus, the shadow object generating means may change the density, the degree of semitransparency or color of the shadow object according to the situation of light and shade in the environment surrounding the three-dimensional body and the situation of light and shade in the environment surrounding the observing point.

Here, in the image generation apparatus, in the case where the three-dimensional body has at least two operable reference legs and when the reference legs operate, may further comprise: scale determining means for determining the scale of the shadow object after the reference legs operate by multiplying the scale of the shadow object that serves as the reference before the reference legs created by the shadow object generating means operate by a ratio obtained by dividing the width between the ends of the reference legs after the reference legs operate by the width between the ends of the reference legs before the reference legs operate; and post-operation shadow object generating means for generating a shadow object using the scale determined by the scale determining means based on a predetermined reference point.

In the image generation apparatus, when the three-dimensional body has a lumbar part that serves as a fulcrum of the reference legs, the predetermined reference point may be obtained by assigning predetermined weights to the projection point of the lumbar part parallel-projected onto the topographical object and the projection points corresponding to the ends of the at least two reference legs.

In the image generation apparatus, wherein in the case where the three-dimensional object has at least two operable reference legs, the positional relationship may be a positional relationship between the midpoint of a straight line connecting the ends of the two reference legs and the topographical object.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 2000-226933 filed on Jul. 27, 2000 including specification, claims, drawings and summary are incorporated herein by reference in its entirety.

What is claimed is:

1. An image generation apparatus that generates a shadow object to express the shadow of a three-dimensional body set in a virtual space, comprising:
   a topographical object on which said shadow object of the three-dimensional body is displayed; and
   shadow object generating means for generating a shadow object to be displayed on said topographical object according to a positional relationship between said three-dimensional body and said topographical object and a scale relationship based on the positional relationship.

2. The image generation apparatus according to claim 1, wherein in the case where said three-dimensional body does not contact said topographical object, said shadow object generating means increases the degree of transparency of the shadow object as the distance between said three-dimensional body and said topographical object increases and decreases the degree of transparency of the shadow object as the distance between said three-dimensional body and said topographical object decreases.

3. The image generation apparatus according to claim 2, wherein in the case where said three-dimensional body contacts said topographical object, said shadow object generating means generates a shadow object in black.

4. The image generation apparatus according to claim 1, wherein in the case where said three-dimensional body contacts said topographical object, said shadow object generating means generates a shadow object based on the shadow by parallel projection on said topographical object of said three-dimensional body and in the case where said three-dimensional body does not contact said topographical object, increases the degree of transparency of the shadow object and contracts said shadow by parallel projection as the distance between said three-dimensional body and said topographical object increases, and decreases the degree of transparency of the shadow object and expands said shadow by parallel projection as the distance between said three-dimensional body and said topographical object decreases.

5. The image generation apparatus according to claim 1, wherein in the case where said three-dimensional body contacts said topographical object, said shadow object generating means generates a shadow object by parallel projection on said topographical object of said three-dimensional body and in the case where said three-dimensional body does not contact said topographical object, generates a shadow object by interpolating the shadow object rounder than said shadow by parallel projection as the distance between said three-dimensional body and said topographical object increases.

6. The image generation apparatus according to any one of claim 1 to claim 5, wherein in the case where the normal of said topographical object and the projection line of parallel projection do not form a right angle, said shadow object generating means diagonally projects and creates said shadow object onto said topographical object according to said angle and increases the degree of semitransparency of the shadow object as said angle comes closer to the right angle.

7. The image generation apparatus according to claim 6, wherein in the case where said three-dimensional body contacts said topographical object or said three-dimensional body is moving with respect to and in contact with said topographical object, said shadow object generating means generates the shadow object in black and in the case where said three-dimensional body does not contact said topographical object or said three-dimensional body is moving with respect to said topographical object without contacting said topographical object, displays said shadow object by making the color of the shadow object closer to the color of said topographical object as the distance between said three-dimensional body and said topographical object increases.

8. The image generation apparatus according to claim 6, wherein in the case where said three-dimensional body contacts said topographical object or said three-dimensional body is moving with respect to and in contact with said topographical object, said shadow object generating means displays said shadow object in the color of said three-dimensional body and in the case where said three-dimensional body does not contact said topographical object or said three-dimensional body is moving with respect to said topographical object without contacting said topographical object, displays said shadow object by making the color of the shadow object closer to black as the distance between said three-dimensional body and said topographical object increases.

9. The image generation apparatus according to any one of claim 1 to claim 5, in the case where said three-dimensional body has at least two operable reference legs and when said reference legs operate, further comprising:
   scale determining means for determining the scale of the shadow object after said reference legs operate by multiplying the scale of the shadow object that serves as the reference before said reference legs created by said shadow object generating means operate by a ratio obtained by dividing the width between the ends of said reference legs after said reference legs operate by the width between the ends of said reference legs before said reference legs operate; and
   post-operation shadow object generating means for generating a shadow object using the scale determined by said scale determining means based on a predetermined reference point.

10. The image generation apparatus according to claim 9, wherein when said three-dimensional body has a lumbar part that serves as a fulcrum of said reference legs, said predetermined reference point is obtained by assigning predetermined weights to the projection point of said lumbar part parallel-projected onto said topographical object and the projection points corresponding to the ends of said at least two reference legs.

11. The image generation apparatus according to claim 10, wherein in the case where said three-dimensional object has at least two operable reference legs, said positional relationship is a positional relationship between the midpoint of a straight line connecting the ends of said two reference legs and said topographical object.

12. The image generation apparatus according to any one of claim 1 to claim 5, wherein in the case where said three-dimensional object has at least two operable reference legs, said positional relationship is a positional relationship between the midpoint of a straight line connecting the ends of said two reference legs and said topographical object.

13. An image generation apparatus that generates a shadow object to express the shadow of a three-dimension body set in a virtual space, comprising:
   a topographical object on which said shadow object of the three-dimensional body is displayed; and
   shadow object generating means for generating a shodow object to be displayed on said topographical object according to a positional relationship between said three-dimensional body and said topographical object, wherein in the case where said three-dimensional body contacts said topographical object, said shadow object generating means generates a shadow object based on the shadow by parallel projection on said topographical object of said three-dimensional body and in the case where said three-dimensional body does not contact said topographical object, contracts said shadow by said parallel projection as the distance between said three-dimensional body and said topographical object increases.

14. An image generation apparatus that generates a shadow object to express the shadow of a three-dimensional body set in a virtual space, comprising:

a topographical object on which said shadow object of the three-dimensional body is displayed; and shadow oject generating means for generating a shadow object to be displayed on said topographical object according to a positional relationship between said three-dimensional body and said topographical object, wherein in the case where said three-dimensional body contacts said topographical object, said shadow object generating means generates a shadow object based on the shadow by parallel projection on said topographical object of said three-dimensional body and in the case where said three-dimensional body does not contact said topographical object, generates a shadow object by perspective projection projected from the center of a predetermined projection line in said virtual space.

15. An image generation apparatus that generates a shadow object to express the shadow of a three-dimensional body set in a virtual space, comprising:

a topographical object on which said shadow object of the three-dimensional body is displayed; and shadow object generating means for generating a shadow object to be displayed on said topographical object according to a speed relationship between said three-dimensional body and said topographical object.

16. The image generation apparatus according to claim 15, wherein in the case where said three-dimensional body is moving with respect to said topographical object, said shadow object generating means increases the degree of transparency of the shadow object as the moving speed of said three-dimensional body increases and decreases the degree of transparency of the shadow object as the moving speed of said three-dimensional body decreases.

17. The image generation apparatus according to claim 16, wherein in the case where said three-dimensional body is stationary with respect to said topographical object, said shadow object generating means generates the shadow object in black.

18. The image generation apparatus according to claim 16, wherein in the case where said three-dimensional body is moving with respect to said topographical object, said shadow object generating means decreases the density of the shadow object and generates said shadow object including the trail of said shadow object.

19. The image generation apparatus according to any one of claim 15 to claim 18, wherein in the case where said three-dimensional body contacts said topographical object or said three-dimensional body is moving with respect to and in contact with said topographical object, said shadow object generating means generates the shadow object in black and in the case where said three-dimensional body does not contact said topographical object or said three-dimensional body is moving with respect to said topographical object without contacting said topographical object, displays said shadow object by making the color of the shadow object closer to the color of said topographical object as the distance between said three-dimensional body and said topographical object increases.

20. The image generation apparatus according to any one of claim 15 to claim 18, wherein in the case where said three-dimensional body contacts said topographical object or said three-dimensional body is moving with respect to and in contact with said topographical object, said shadow object generating means displays said shadow object in the color of said three-dimensional body and in the case where said three-dimensional body does not contact said topographical object or said three-dimensional body is moving with respect to said topographical object without contacting said topographical object, displays said shadow object by making the color of the shadow object closer to black as the distance between said three-dimensional body and said topographical object increases.

21. The image generation apparatus according to any one of claim 15 to claim 18, in the case where said three-dimensional body has at least two operable reference legs and when said reference legs operate, further comprising:

scale determining means for determining the scale of the shadow object after said reference legs operate by multiplying the scale of the shadow object that serves as the reference before said reference legs created by said shadow object generating means operate by a ratio obtained by dividing the width between the ends of said reference legs after said reference legs operate by the width between the ends of said reference legs before said reference legs operate; and post-operation shadow object generating means for generating a shadow object using the scale determined by said scale determining means based on a predetermined reference point.

22. The image generation apparatus according to claim 21, wherein when said three-dimensional body has a lumbar part that serves as a fulcrum of said reference legs, said predetermined reference point is obtained by assigning predetermined weights to the projection point of said lumbar part parallel-projected onto said topographical object and the projection points corresponding to the ends of said at least two reference legs.

23. The image generation apparatus according to claim 22, wherein in the case where said three-dimensional object has at least two operable reference legs, said positional relationship is a positional relationship between the midpoint of a straight line connecting the ends of said two reference legs and said topographical object.

24. The image generation apparatus according to any one of claim 15 to claim 18, wherein in the case where said three-dimensional object has at least two operable reference legs, said positional relationship is a positional relationship between the midpoint of a straight line connecting the ends of said two reference legs and said topographical object.

25. An image generation apparatus that generates a shadow object to express the shadow of a three-dimensional body set in a virtual space, comprising:

a topographical object on which said shadow object of the three-dimensional body is displayed; and shadow object generating means for generating a shadow object to be displayed on said topographical object according to the distance between a predetermined observing point in said virtual space and said three-dimensional body, wherein in the case where said three-dimensional body is within a predetermined range from said observing point, said shadow object generating means generates the shadow object semi-transparent and in the case where said three-dimensional body is outside the predetermined range from said observing point, displays the shadow object in black.

26. The image generation apparatus according to claim 25, wherein said shadow object generating means changes the density, the degree of semitransparency or color of said shadow object according to the situation of light and shade in the environment surrounding said three-dimensional body and the situation of light and shade in the environment surrounding said observing point.

27. The image generation apparatus according to claim 26, in the case where said three-dimensional body has at least two operable reference legs and when said reference legs operate, further comprising:

scale determining means for determining the scale of the shadow object after said reference legs operate by multiplying the scale of the shadow object that serves as the reference before said reference legs created by said shadow object generating means operate by a ratio obtained by dividing the width between the ends of said reference legs after said reference legs operate by the width between the ends of said reference legs before said reference legs operate; and post-operation shadow object generating means for generating a shadow object using the scale determined by said scale determining means based on a predetermined reference point.

28. The image generation apparatus according to claim 27, wherein when said three-dimensional body has a lumbar part that serves as a fulcrum of said reference legs, said predetermined reference point is obtained by assigning predetermined weights to the projection point of said lumbar part parallel-projected onto said topographical object and the projection points corresponding to the ends of said at least two reference legs.

29. The image generation apparatus according to claim 27 or 28, wherein in the case where said three-dimensional object has at least two operable reference legs, said positional relationship is a positional relationship between the midpoint of a straight line connecting the ends of said two reference legs and said topographical object.

30. The image generation apparatus according to claim 25, in the case where said three-dimensional body has at least two operable reference legs and when said reference legs operate, further comprising:

scale determining means for determining the scale of the shadow object after said reference legs operate by multiplying the scale of the shadow object that serves as the reference before said reference legs created by said shadow object generating means operate by a ratio obtained by dividing the width between the ends of said reference legs after said reference legs operate by the width between the ends of said reference legs before said reference legs operate; and post-operation shadow object generating means for generating a shadow object using the scale determined by said scale determining means based on a predetermined reference point.

31. The image generation apparatus according to claim 25, wherein in the case where said three-dimensional object has at least two operable reference legs, said positional relationship is a positional relationship between the midpoint of a straight line connecting the ends of said two reference legs and said topographical object.

32. An image generation method for generating a shadow object to express the shadow of a three-dimensional body set in a virtual space, wherein a shadow object of said three-dimensional body to be displayed on a topographical object is generated according to a positional relationship between said three-dimensional body and said topographical object and a scale relationship based on the positional relationship.

33. An image generation method for generating a shadow object to express the shadow of a three-dimensional body set in a virtual space, wherein a shadow object of said three-dimensional body to be displayed on a topographical object is generated according to a speed relationship between said three-dimensional body and said topographical object.

34. An image generation method for generating a shadow object to express the shadow of a three-dimensional body set in a virtual space, wherein a shadow object of said three-dimensional body to be displayed on a topographical object is created according to the distance between a predetermined observing point in said virtual space and said three-dimensional body, wherein in the case where said three-dimensional body is within a predetermined range from said observing point, said shadow object generating means generates the shadow object semitransparent and int he case where said three-dimensional body is outside the predetermined range from said observing point, displays the shadow object in black.

35. A recording medium storing a computer-readable program to execute an image generation method for generating a shadow object to express the shadow of a three-dimensional body set in a virtual space, wherein a shadow object of said three-dimensional body to be displayed on a topographical object is created according to a positional relationship between said three-dimensional body and said topographical object and a scale relationship based on the positional relationship.

36. A recording medium storing a computer-readable program to execute an image generation method for generating a shadow object to express the shadow of a three-dimensional body set in a virtual space, wherein a shadow object of said three-dimensional body to be displayed on a topographical object is created according to a speed relationship between said three-dimensional body and said topographical object.

37. A recording medium storing a computer-readable program to execute an image generation method for generating a shadow object to express the shadow of a three-dimensional body set in a virtual space, wherein a shadow object of said three-dimensional body to be displayed on a topographical object is created according to the distance between a predetermined observing point in said virtual space and said three-dimensional body, wherein in the case where said three-dimensional body is within a predetermined range from said observing point, said shadow object generating means generates the shadow object semitransparent and in the case where said three-dimensional body is outside the predetermined range from said observing point, displays the shadow object in black.

* * * * *

UNITED STATES PATENT AND TRADEMARK OFFICE
CERTIFICATE OF CORRECTION

PATENT NO.     : 6,798,408 B2
DATED          : September 28, 2004
INVENTOR(S)    : Katsuya Tokuyama and Ryoichi Kaku It is certified that error appears in the above-identified patent and that said Letters Patent is hereby corrected as shown below:

Column 19,
Line 34, please delete "contracts" and substitute -- contacts --.
Line 52, please delete "claim 1 to claim 5" and substitute -- claims 1-5 or 13-14 --.

Column 20,
Lines 22 and 53, please delete "claim 1 to claim 5" and substitute -- claims 1-5 or 13-14 --.

Column 21,
Line 6, please delete "contracts" and substitute -- contacts --.

Signed and Sealed this

Twenty-first Day of December, 2004

JON W. DUDAS
*Director of the United States Patent and Trademark Office*